US006266708B1

(12) United States Patent
Austvold et al.

(10) Patent No.: US 6,266,708 B1
(45) Date of Patent: Jul. 24, 2001

(54) OBJECT ORIENTED APPLICATION PROGRAM DEVELOPMENT FRAMEWORK MECHANISM

(75) Inventors: Shawn M. Austvold; Rebecca B. Legler, both of Rochester, MN (US); Marshall P. Cline, Potsdam, NY (US); Daniel R. Dahl, Kasson, MN (US); Jim Evans, Rochester, MN (US); Peter M. Gaertner, Minneapolis, MN (US); Neal Hale; Sujatha Pothireddy, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/505,732

(22) Filed: Jul. 21, 1995

(51) Int. Cl.$^7$ ........................................................ G06F 9/54
(52) U.S. Cl. .............................................. 709/315; 717/1
(58) Field of Search ................................. 395/680, 682, 395/683; 709/310–332; 717/1–10

(56) References Cited

U.S. PATENT DOCUMENTS 5,465,363 * 11/1995 Orton et al. ........................ 709/107
5,509,123 *  4/1996 Dobbins et al. ................... 709/243

OTHER PUBLICATIONS

Marshall, Patrick, "N/Joy may carry object orientation too far: 'office' setup is innovative but leaves out some ease–of–use features", InfoWorld, v14, n28, p67(2), Jul. 1992.*

Schimpf, et al., "Letters to the Editor", PC Week, v9, n27, p78(1), Jul. 1992.*
Orfali et al., "Essential Client/Server Survival Guide", Van Nostrand Reinhold, pp. 407–420, 1994.*

* cited by examiner

*Primary Examiner*—St.-John Courtenay, III
(74) *Attorney, Agent, or Firm*—Baker & Maxham; Martin & Associates, L.L.C.; Derek P. Martin

(57) ABSTRACT

A framework for use with object-oriented programming systems includes one or more objects of a class called "Socket" that receive and process packets of work. As various applications execute, they require servicing of tasks, which correspond to the packets of work mentioned above. The packets of work are represented in the framework by objects of a class called "WorkUnit". When a WorkUnit object is generated by an application, it in turn generates an object of a class called "Retriever" which is associated with the appropriate Socket object needed for servicing the WorkUnit. The Retriever object retrieves the Socket object to service the WorkUnit from an object of a class called "SessionInfo". The SessionInfo object is a single object for maintaining registries of Socket objects and objects of a class called "ApplicationInfo". ApplicationInfo objects contain application specific information that can be used, manipulated, and shared between one or more WorkUnits of a given application. WorkUnits of an application can retrieve ApplicationInfo objects from the SessionInfo object by use of a Retriever object which is associated with the appropriate ApplicationInfo object. The framework includes a core set of objects, including SessionInfo, Socket, ApplicationInfos, Retrievers, and WorkUnits, and permits user-defined, extensible instances of these objects that permit tailoring of tasks for particular needs.

35 Claims, 15 Drawing Sheets ance invention satisfies these needs.

OBJECT ORIENTED APPLICATION PROGRAM DEVELOPMENT FRAMEWORK MECHANISM

BACKGROUND OF THE INVENTION

1. Field of the Invention

The present invention relates generally to data processing and, more specifically, to object-oriented programming systems and processes.

2. Description of the Related Art

Application programs are sequences of program instructions that are executed on programmable, general purpose computers to perform problem-solving tasks. Application programs are very important within the computer industry because they allow users of the computer system to perform meaningful work. In fact, application programs are so important that the ultimate value of the whole computer system is often judged based on the quality and number of application programs that it can execute.

Application programs can be developed to aid computer system users in a wide variety of tasks. For example, there have been many application programs written to aid users in tasks that are related to banking, inventory control, and scientific analysis. Typically, application programs are developed by individuals or teams of individuals in a way that addresses the specific problem at hand. However, developing an application program is not an easy process. Indeed, the process of developing application programs is fraught with many inherent pitfalls.

One problem is that each application program typically requires different types of data to be maintained and different manipulations to be performed on the data. For example, banking transactions must be confirmed and logged, inventory orders must be validated, and scientific operations must be checked for errors. As a result, application programs are often designed to be unique unto themselves. That is, the program instructions are application-dependent even though the low-level tasks performed by different application programs all involve the storage, retrieval, and manipulation of data. Of course, this not only is wasteful but also leads to the additional problem of having to maintain a series of application programs that all store, retrieve, and manipulate data in different ways.

Another problem associated with application program development is that communication between different application programs is often difficult. Communication between present day application programs is usually accomplished through what are referred to as application program interfaces or APIs for short. Since APIs rigidly define both the manner in which data can be exchanged and the particular items of data that can be exchanged, it is sometimes difficult to change an application program to handle different data or to make a previously created application program communicate with a new application program.

Adding features to application programs is yet another problem because the entire application program must typically be recompiled to activate the new feature. This is a daunting task because many application programs include literally tens of thousands of lines of programming instructions, which means that recompilation can be an extremely long process.

Still another problem with application program development is extending or modifying an existing application program so that it can take advantage of a new programming development. For example, modifying an application program that was originally designed to execute on a single processor computer system such that it could operate on a multiprocessor system can involve considerable effort and a substantial amount of redesign.

From the discussion above, it should be apparent that there is a need for an application program development mechanism that allows for the development of application programs that 1) do not involve duplication of effort to perform common tasks, 2) do not place heavy burdens on program maintenance, and 3) permit the addition of program features without requiring total recompilation and/or redesign. Moreover, there is a need for an application program development mechanism that provides a standard program interface that facilitates communication between application programs. The present invention satisfies these needs.

SUMMARY OF THE INVENTION

In accordance with the present invention, a reusable object-oriented (OO) framework for use with object-oriented programming systems permits plug-compatible application program development in either local or distributed computing environments. The framework includes one or more objects of a class called "Socket" that receive and process program operations comprising packets of work. As various applications execute, they require servicing of the packets of work, which are represented in the framework by objects of a class called "WorkUnit". When a WorkUnit object is generated by an application, it in turn generates an object of a class called "Retriever", which is associated with the appropriate Socket object needed for servicing the WorkUnit. The Retriever object retrieves the Socket object from an object of a class called "SessionInfo" to service the WorkUnit object. If the SessionInfo object does not already contain an instance of the Socket object being retrieved, it will generate one, add it to the SessionInfo object, and return it to the requesting WorkUnit object. The SessionInfo object is a single object for maintaining registries of Socket objects and objects of a class called "ApplInfo". ApplInfo objects contain application specific information that can be used, manipulated, and shared between one or more WorkUnits of a given application. WorkUnit objects of an application can retrieve ApplInfo objects from the SessionInfo object by use of a Retriever object which is associated with the appropriate ApplInfo object. If the SessionInfo object does not already contain an instance of the ApplInfo object being retrieved, it will generate one, add it to the SessionInfo object, and return it to the requesting WorkUnit object.

The only responsibility of the Socket objects is to receive and perform WorkUnit objects. The Socket objects perform WorkUnit objects by invoking them. A WorkUnit object is invoked by calling a "doIt" method, which is defined by the framework user according to the application program being developed. WorkUnit objects generate other WorkUnit objects and send them to Socket objects to be received and processed. Many WorkUnit objects may subdivide a given application into many smaller work packets which are all represented by WorkUnit objects. The WorkUnit objects chained together collectively perform the larger work packet of the application itself. The framework includes a core set of classes, including SessionInfo, Socket, ApplInfo, Retriever, and WorkUnit classes. In addition, some of these classes such as Socket, ApplInfo, Retriever, and WorkUnit may be further customized through the use of inheritance. In this way, the framework provides a means for defining program work packets and for sharing such defined work packets among several application programs. Thus, application development time is reduced because application programs can be developed around "plug-compatible" work objects that provide commonly needed functions and users have the flexibility to define extensible classes for custom functions. That is, the framework provides application developers with the ability to use core, predefined classes and also to add further classes without worrying about compatibility problems and without need for total recompilation.

If desired, different socket types can be defined for different work packets. For example, an object of a class called "FirstSocket" can process WorkUnit objects by invoking a "doItS1" method and an object of a class called "SecondSocket" can process WorkUnit objects by invoking a "doItS2" method. These "doIt" methods (in the generic sense of the term) are user-defined by the framework client (i.e., they are pure virtual functions) in the derived classes of FirstSocketWorkUnit and could in the first case (doItS 1) request information and in the second case (doItS2) process that information. Socket objects run in their own thread of control or process on multiprocessing systems and can therefore process WorkUnit objects in an asynchronous fashion if desired. A WorkUnit object derived from the class "FirstSocketWorkUnit" can only be sent to FirstSocket objects to be processed. By comparison, a WorkUnit object derived from the class "SecondSocketWorkUnit" can be sent and processed by either the FirstSocket or SecondSocket objects. The reason for this is that a SecondSocketWorkUnit is derived from a FirstSocketWorkUnit and thus will inherit the doItS1( ) method. In addition, the SecondSocketWorkUnit adds the method doItS2( ) which is processed by the SecondSocket. Within the "doIt" method of a WorkUnit object, a single work packet may be processed and completed, then returned to the invoker with the results. Likewise, a WorkUnit object could further subdivide the work packet down into smaller multiple work packets represented by other WorkUnit objects. In this case, the original WorkUnit object generates additional WorkUnit objects into a chain of modular work packets to complete the larger task at hand. These WorkUnit objects have a parent-child relationship in which a child WorkUnit will return to its parent WorkUnit when the child WorkUnit is complete with its specific work packet. Thus, WorkUnit objects can entail single work packets or can be chained into multiple work packets collectively processing and controlling the program flow in an entire application.

Other features and advantages of the present invention should be apparent from the following description of the preferred embodiment, which illustrates, by way of example, the principles of the invention.

DESCRIPTION OF THE PREFERRED EMBODIMENT

Overview—Object Oriented Technology

Figure 1:
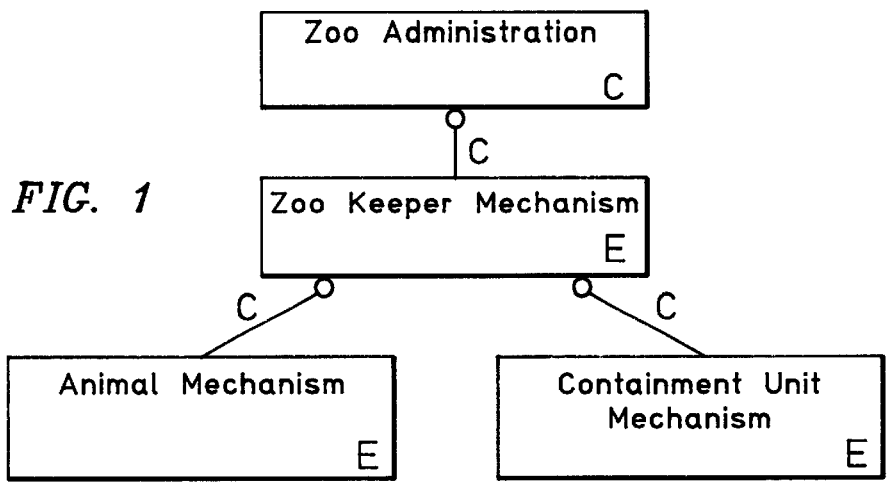
FIG. 1 is a category diagram of an exemplary Zoo Administration framework that illustrates the principles implemented by the system of the present invention.

As discussed in the Summary section, the present invention was developed using Object-Oriented (OO) framework technology. Individuals skilled in the art of OO framework technology may wish to proceed to the Detailed Description section of this specification. However, those individuals who are new to framework technology, or new to OO technology in general, should read this overview section in order to best understand the benefits and advantages of the present invention.

Object-Oriented Technology v. Procedural Technology

Though the present invention relates to a particular OO technology (i.e., OO framework technology), the reader must first understand that, in general, OO technology is significantly different than conventional, process-based technology (often called procedural technology). While both technologies can be used to solve the same problem, the ultimate solutions to the problem are always quite different. This difference stems from the fact that the design focus of procedural technology is wholly different than that of OO technology. The focus of process-based design is on the overall process that solves the problem; whereas, the focus of OO design is on how the problem can be broken down into a set of autonomous entities that can work together to provide a solution. The autonomous entities of OO technology are called objects. Stated another way, OO technology is significantly different from procedural technology because problems are broken down into sets of cooperating objects instead of into hierarchies of nested computer programs or procedures. That is, procedural technology defines a system in terms of data variables and process functions whereas OO technology defines a system in terms of objects and classes.

The Term "Framework"

There has been an evolution of terms and phrases which have particular meaning to those skilled in the art of OO design. However, the reader should note that one of the loosest definitions in the OO art is the definition of the word "framework." The word framework means different things to different people. Therefore, when comparing the characteristics of two supposed OO frameworks, the reader should take care to ensure that the comparison is indeed one of "apples to apples." As will become more clear in the forthcoming paragraphs, the term framework is used in this specification to describe an OO technology system that has been designed to have core function and extensible function. The core function is that part of the framework that is not subject to modification by the framework purchaser. The extensible function, on the other hand, is that part of the framework that has been explicitly designed to be customized and extended by the framework purchaser as part of its implementation.

OO Framework

While in general terms an OO framework can be properly characterized as a type of OO solution to a programming problem, there is nevertheless a fundamental difference between a framework and a basic OO programming solution. The difference is that frameworks are designed in a way that permits and promotes customization and extension of certain aspects of the OO solution, whereas a basic OO solution can be said to comprise a particular collection, or library, of classes and objects. In other words, frameworks provide an OO programming solution that can be customized and extended to address individualized requirements that change over time. Of course, the customization/extension quality of frameworks is extremely valuable to purchasers (referred to herein as framework consumers) because the cost of customizing or extending a framework is much less than the cost of a replacing or reworking an existing program solution.

Therefore, when framework designers set out to solve a particular problem, they should do more than merely design individual objects and specify how those objects interrelate. They should also design the core function of the framework (i.e., that part of the framework that is not to be subject to potential customization and extension by the framework consumer) and the extensible function of the framework (i.e., that part of the framework that is to be subject to potential customization and extension). In the end, the ultimate worth of a framework rests not only on the quality of the object design, but also on the design choices involving which aspects of the framework represent core function and which aspects represent extensible function.

ZAF—An Illustrative Framework

While those skilled in the art appreciate that framework design is necessarily an intertwined and iterative process, example design choices for a simplistic framework are set forth in the paragraphs that follow. It should be understood, though, that this is only an example framework that is being used in this specification to illustrate and best explain frameworks such that the reader can better understand and appreciate the benefits and advantages of the present invention.

Framework designers determine what objects are needed for a framework mechanism by selecting objects from what is called the problem domain. The problem domain is an abstract view of the specific problem at hand. The example problem domain chosen for the illustrative framework is that of zoo administration. The specific problem presented is that of designing a framework that assists zoo keepers in the care and feeding of zoo animals. In the example, which will be referred to as a Zoo Administration Framework (ZAF), an OO framework designer would look to the zoological problem domain and decide that any ZAF would of necessity involve an abstraction that represents the relationship between zoo keepers and animals (i.e., represents how zoo keepers care for animals). The framework designer would also likely recognize that zoo animals usually live in cages, pens, tanks, and other sorts of containment units. Therefore, the framework designer also would start with the idea that the framework would have to involve abstractions or mechanisms that represent all of these fundamental entities and relationships.

How ZAF is Designed

To begin the design process, the framework designer would likely begin with what is called a category diagram. Category diagrams are used to describe frameworks at a high level and to define how the framework components relate to one another. FIG. 1 is a category diagram for the example framework ZAF. The notation used in FIG. 1, and that used in the other figures of this specification, is explained in detail in the Notation section at the end of this portion of the specification. Each entity, or icon, in a category diagram represents groupings of data objects that perform a particular function. For the purposes of illustration, assume that the framework designer decides that ZAF should be made up of four components that, at a high level perspective, will be referred to as mechanisms: a zoo administration mechanism, a zoo keeper mechanism, an animal mechanism, and a containment unit mechanism.

As shown in FIG. 1, the zoo administration mechanism has been designed to use the zoo keeper mechanism to administer the zoo. The zoo administration mechanism is therefore said to have a "using" relationship with the zoo keeper mechanism. (Again, please refer to the notation section of this specification for an explanation of this relationship and the other notation used in this specification.)

As discussed above, the zoo administration mechanism has been designed to have responsibility for overall control of ZAF. Accordingly, the zoo administration mechanism is responsible for scheduling the operation of the zoo keeper mechanism. Note also that the framework designer has designed the zoo administration mechanism to be a core function of ZAF, which means that it has been designed such that it will not be subject to potential customization and extension. The upper case block letter "C" in the category box for the zoo administration mechanism denotes this fact. Note further that the "uses" relationship between the zoo administration mechanism and the zoo keeper mechanism also has been designed as a core function such that it is not available for ultimate customization by the framework consumer.

The zoo keeper mechanism has been designed to be generally responsible for the care and feeding of the zoo animals. Accordingly, it uses the animal and containment unit mechanisms to perform its tasks. Unlike the design of the zoo administration mechanism, however, the framework designer has designed the zoo keeper mechanism to be an extensible function, which again means that the zoo keeper mechanism has been designed to be available for modification and/or extension by the framework consumer to address future care and feeding requirements. This fact is denoted by the upper case block letter "E" in the zoo keeper mechanism category box.

The framework designer has designed the animal mechanism to represent the animal side of the interaction between zoo animals and zoo keepers. Since the animal population in the zoo is something that changes on a regular basis, the animal mechanism has similarly been designed as an extensible function. The containment unit mechanism interacts with the zoo keeper mechanism by representing individual containment units such as pens, tanks, and cages. Like the animal mechanism, the containment unit mechanism has been designed as an extensible function such that it can handle future customization and extension requirements. Please note here, however, that even though the zoo keeper, zoo animal, and containment unit mechanisms have all been designed as extensible functions, the relationships between the mechanisms have been designed to be a core function of ZAF. In other words, even though it is desirable to give ZAF's consumers flexibility relative to the zoo keeper, zoo animal, and containment unit mechanisms, it is not desirable to allow ZAF's consumers to change how these mechanisms relate to one another.

The framework designer next designs the classes and relationships that make up the mechanisms shown on FIG. 1. A class is a definition of a set of like objects. As such, a class can be thought of as an abstraction of the objects or as a definition of a type of object. From the view of a computer system, a single object represents an encapsulated set of data and the operation or a group of operations that are performed by a computer system upon that data. In fact, in a secure computer system, the only access to the information controlled by an object is via the object itself. This is why the information contained in an object is said to be encapsulated by the object.

Each class definition comprises data definitions that define the information controlled by the object and operation definitions that define the operation or operations performed by objects on the data that each object controls. In other words, a class definition defines how an object acts and reacts to other objects by defining an operation or set of operations that is/are performed on the defined data. (Please note that operations are sometimes called methods, method programs, and/or member functions.) When taken together, the defined operation(s) and data are said to be the behavior of the object. In essence, then, a class definition defines the behavior of its member object or objects.

Figure 2:
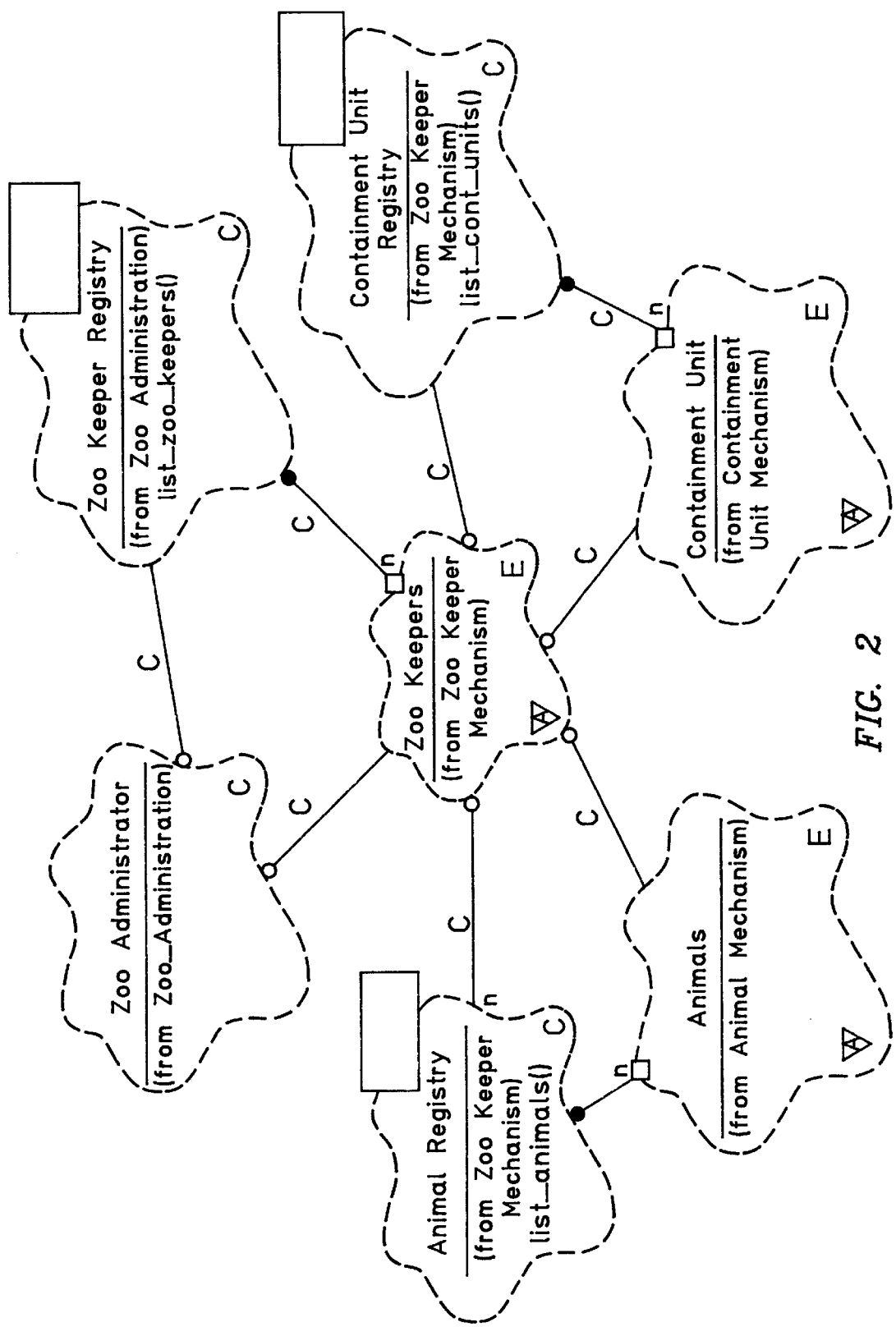

FIG. 2 is an OO class diagram that shows the fundamental classes that the framework designer has designed for ZAF. Each class representation indicates its relationship to the mechanisms shown on FIG. 1. For example, the zoo keepers class is denoted as being from the Zoo Keeper mechanism. The fundamental classes of ZAF include: the zoo administrator class, which is part of the zoo administration mechanism; the zoo keeper registry class, which is also part of the zoo administration mechanism; the animal registry class, which is part of the zoo keeper mechanism; the zoo keepers class, which is also part of the zoo keeper mechanism; the containment unit registry class, which is also part of the zoo keeper mechanism; the animals class, which is part of the animal mechanism; and the containment unit class, which is part of the containment unit mechanism. It should be noted that the relationships between the classes have been designed as core functions of ZAF such that they are not available for ultimate modification by ZAF's consumers.

The zoo administrator class is the definition of the object that is responsible for the overall control of ZAF. Again, OO classes only define the objects that interact to provide a solution to the problem. However, it is by exploring the characteristics of the class definitions that one is able to understand how the objects of the framework mechanism have been designed to provide a living solution that can be customized and/or extended to address future requirements.

The zoo administration class has been designed to have a "uses" relationship with the zoo keeper registry. The framework designer has designed the zoo administration and zoo registry classes to be a core function of ZAF because the designer has decided that ZAF's consumers should not be allowed to modify the behavior of objects that are members of these class definitions. The zoo keeper registry, which has what is called a "contains by reference" relationship with the zoo keeper class, is simply a class that defines an object that is a container for all zoo keeper objects. Accordingly, the zoo keeper registry includes a definition for a list_zoo_keepers( ) operation. As will be described later, this operation is responsible for providing a list of zoo keeper objects to other objects that request such a list.

Figure 3:
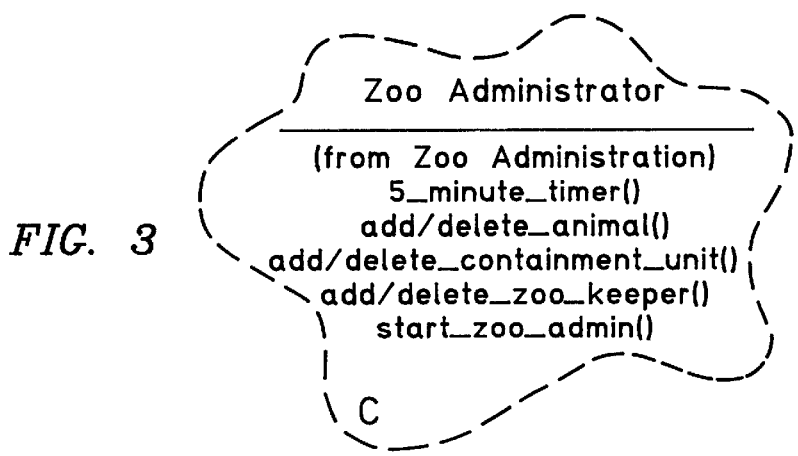
FIGS. 2, 3, 4, 5, and 6 are class diagrams for the exemplary Zoo Administration framework of FIG. 1.

FIG. 3 shows a lower level view of the zoo administrator class. Because objects of type zoo administrator have responsibility for overall control of ZAF, the zoo administrator class has been designed to include operations that perform tasks oriented towards zoo administration. The class definition includes the following five operations: 5_minute_timer( ), add_animal( ), add_containment unit( ), add_zoo_keeper( ), and start_zoo_admin( ).

The start_zoo_admin( ) operation is responsible for starting ZAF. That is, a user or system administrator will interact with the start_zoo_admin( ) operation to begin administration of a zoo via ZAF. The start_zoo_admin( ) operation has been designed to initiate the 5_minute_timer( ) operation such that, every five minutes, the 5_minute_timer( ) operation instructs the zoo keeper objects to go out and check on the zoo animals. The add/delete_zoo_keeper( ) operation is responsible for interacting with users of ZAF to define additional zoo keepers (i.e., additional zoo keeper classes), to add additional zoo keepers (i.e., zoo keeper objects), and to remove zoo keeper classes and/or objects. As will become clear in the forthcoming paragraphs, each zoo keeper object is responsible for performing a particular zoo task. Therefore, it is natural that a user of ZAF might well want to add a zoo keeper definition and object to handle an additional zoo task or to remove a definition or object that is no longer needed. The ZAF framework designer has provided this flexibility by designing the zoo keeper mechanism as an extensible function.

Like the add/delete_zoo_keeper( ) operation, the add/delete_animal( ) operation is responsible for interacting with users to define additional zoo animal classes and objects and also to remove classes and objects that are no longer needed. Again, it is quite natural for a zoo to need to add and remove animals. The add/delete_containment unit( ) operation is responsible for the definition of new containment unit classes and objects and for removal of classes and/or objects that are no longer necessary. Again, the framework designer has provided such flexibility by designing the animal and containment unit mechanisms as extensible functions.

Referring back to FIG. 2, the zoo keepers class definition has a "uses" relationship with the animal registry, animals, containment unit registry, and containment units classes. Since the value of ZAF is enhanced by allowing ZAF's consumers to customize and extend the zoo keepers, animals, and containment unit classes, the ZAF framework designer has designed these classes as extensible functions. However, changing the behavior of the animal and containment unit registry classes would disrupt the basic operation of ZAF. Therefore, the framework designer has designed these classes to be core functions of ZAF.

Figure 4:
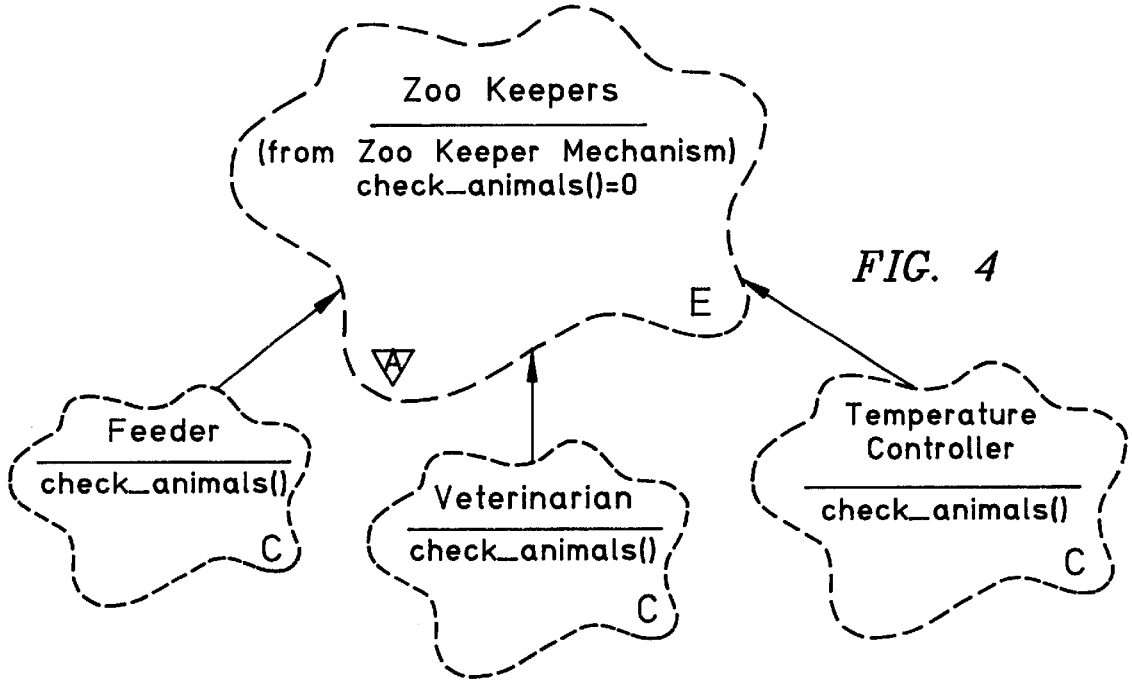

FIG. 4 is a class diagram of the zoo keeper class. However, before describing the details of FIG. 4, it is worthwhile to point out that the class definitions shown on FIG. 4 are ranked in a very simple ordering called a class hierarchy. A class, like the zoo keeper class, that represents the most generalized/abstract class in a class hierarchy is referred to as the base class of the hierarchy. The ordering of classes in a class hierarchy goes from most general to least general (i.e., from general to specific). Less general classes (e.g., the feeder class) are said to inherit characteristics from the more general class or classes (i.e., the zoo keeper class in this case). As such, class definitions feeder, veterinarian, and temperature controller are said to be subclasses of the zoo keeper class. Inheritance mechanisms will be explored in more detail in the discussion associated with FIG. 5.

As shown on FIG. 4, the zoo keeper class definition contains a single operation definition, the check_animals( ) operation definition. The reader should also note that the zoo keepers class definition is marked as being an abstract class. Abstract classes are not designed to have objects created as their members, but are instead used to define a common interface/protocol for their subclasses. A class is said to be an abstract class when at least one of its operation definitions is a pure virtual operation definition. Pure virtual operation definitions are designed for the sole purpose of defining a common interface for subclass definition of that operation. In other words, the design of the actual behavior (i.e., the data and operations) is left to the subclasses themselves. In the case of the zoo keeper class definition, the feeder, veterinarian, and temperature controller subclasses define specific implementations of the pure virtual check_animals( ) operation definition that is contained in the zoo keeper class. An operation is marked as a pure virtual operation when it is set equal to 0.

It is important to note, though, that the common interface of a pure virtual operation definition must be honored by all subclasses such that requesting objects (called client objects) can use subclass member objects (called server objects) without needing to know the particular subclass of the server object. For example, whenever the object defined by the zoo administrator class needs a particular action performed, it interacts with a zoo keeper object. Because the interface to these objects was defined in abstract, base class zoo keeper and preserved in the subclass definitions for the check_animals( ) operation, the zoo administrator object need not have special knowledge about the subclasses of any of the server objects. This has the effect of decoupling the need for the action (i.e., on the part of the zoo administrator object) from the way in which the action is carried out (i.e., by one of the objects of the zoo keepers subclasses). Designs (such as the ZAF design) that take advantage of the characteristics of abstract classes are said to be polymorphic.

Polymorphism is extremely important to OO framework design because it allows the way in which something is done (called the implementation) to be changed or extended without effecting the mechanisms that depend on the fact that the action is actually performed. In other words, client objects need only understand that certain objects perform certain functions, not how those functions are actually carried out. This is one way in which a properly designed OO framework can be readily customized and extended to satisfy future requirements.

Figures 5, 6:
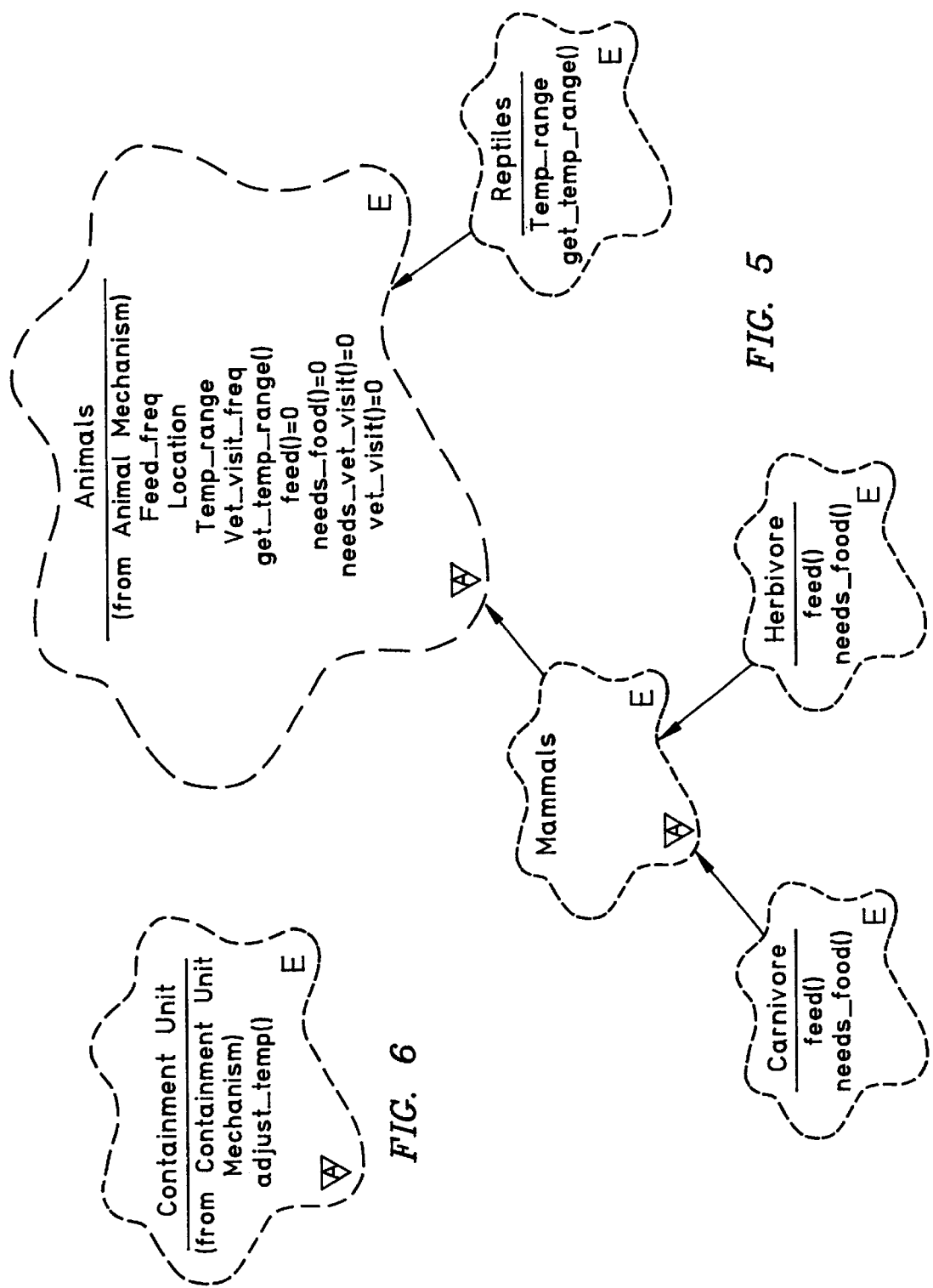

As previously discussed, the framework designer has designed the ZAF framework such that zoo keeper objects interact with animal and containment unit objects to perform their respective tasks. FIG. 5 is a class diagram for the class hierarchy of the abstract class animal. Because the animal class definition is responsible for representing the characteristics and behavior of zoo animals, the framework designer has designed the abstract class animal in a way that reflects this responsibility. As shown, the example class definition for animal includes data definitions feed_freq, location, and temp_range and operation definitions get_temp_range( ), feed( ), needs_food( ), needs_vet visit( ), and vet_visit( ).

For the purposes of this framework overview, it is not necessary to explore each definition in detail. However, the temp_range data definition and the get_temp_range( ) and feed( ) operation definitions are good examples of well thought out framework design choices.

The feed( ) operation definition is designed to perform the actual feeding of the animals (i.e., through specific feeding apparatus, which is not shown). The feed( ) operation is a pure virtual operation. Again, this means that the design of the class is such that the actual mechanism that performs the needed function has been left to be defined by the subclasses. Requiring subclass definition is a good design choice in cases like this where objects that are created as members of the subclasses have particularized needs. In the ZAF framework, for example, each type of animal is likely to have need for a particularized feeding apparatus, which not only makes definition of a generic feed( ) operation difficult, but valueless.

By way of comparison, the framework designer has explicitly designed the get_temp_range( ) operation such that it is not a pure virtual operation definition. This means that get_temp_range( ) has been generically defined as a default operation. As such, it is considered a virtual operation. Default operations are used to provide generic function to subclasses. The subclasses can simply use the default operations or they can customize or extent the default operations by redefinition. Redefinition of a default operation is called overriding the default operation.

Mammals is a subclass of the class animals and, as such, the mammals class inherits all of the characteristics of the animals class. The mammals class is also designed as an abstract class, which again means that it has not been designed to have objects created as its members, but has instead been designed to provide a common interface for its subclasses. Subclass mammal is further subclassed into classes carnivore and herbivore.

Because definition of the feed( ) operation has been left up to the subclasses, the subclasses carnivore and herbivore each have their own definition of the feed( ) operation. Again, this is a good design choice because meat-eating carnivores are going to have different needs than their plant-eating counterparts.

Temp_range is a data definition for the range of temperatures that coincides with that of the specific animal's natural habitat and the get_temp_range( ) operation definition is designed to retrieve the temp_range for a specific animal and return it to a requesting client object. Subclass reptiles contains its own data definition for temp_range and its own definition for the get_temp_range( ) operation. ZAF has been designed this way to point out that data definitions can be overridden just like operation definitions. Since many reptiles live in desert conditions, where nights can be very cold and days very hot, the default temp_range definition has been overridden in the reptiles class to include time and temperature information (not explicitly shown on FIG. 5). This is another good design choice because it allows ZAF to treat reptile containment units differently than other containment units by allowing temperature adjustments to be made based on the time of day as well as on the current temperature of the containment unit itself.

FIG. 6 is a class diagram showing a lower level view of the containment unit class. The containment unit class contains a virtual operation definition adjust_temp( ). The adjust_temp( ) definition defines both the interface and mechanism used to actually adjust the temperature in the containment units of the zoo (i.e., via heating and cooling mechanisms that arc not shown).

How the ZAF Objects Interact

Beyond designing the objects that make up the solution to the specific programming problem, the framework designer must also design how the individual objects interrelate. In other words, the objects must interrelate in way that takes advantage of the manner in which they were designed. As discussed, the way in which the defined operations of an object operate on the data defined for the object is called the object's behavior. While objects may be characterized as autonomous entities, it is still very important that each object exhibit a consistent behavior when interrelating with other objects. Consistent behavior is important because objects depend upon the consistent behavior of other objects so that they themselves can exhibit consistent behavior. In fact, consistent behavior is so important that an object's behavior is often referred to as the contract the object has with the other objects. When an object does not exhibit a consistent behavior, it is said to have violated its contract with the other objects.

When an operation of one object needs access to the data controlled by a second object, it is considered to be a client of the second object. To access the data controlled by the second object, one of the operations of the client will call or invoke one of the operations of the second object to gain access to the data controlled by that object. One of the operations of the called object (i.e., a server operation in this case) is then executed to access and/or manipulate the data controlled by the called object.

Figure 7:
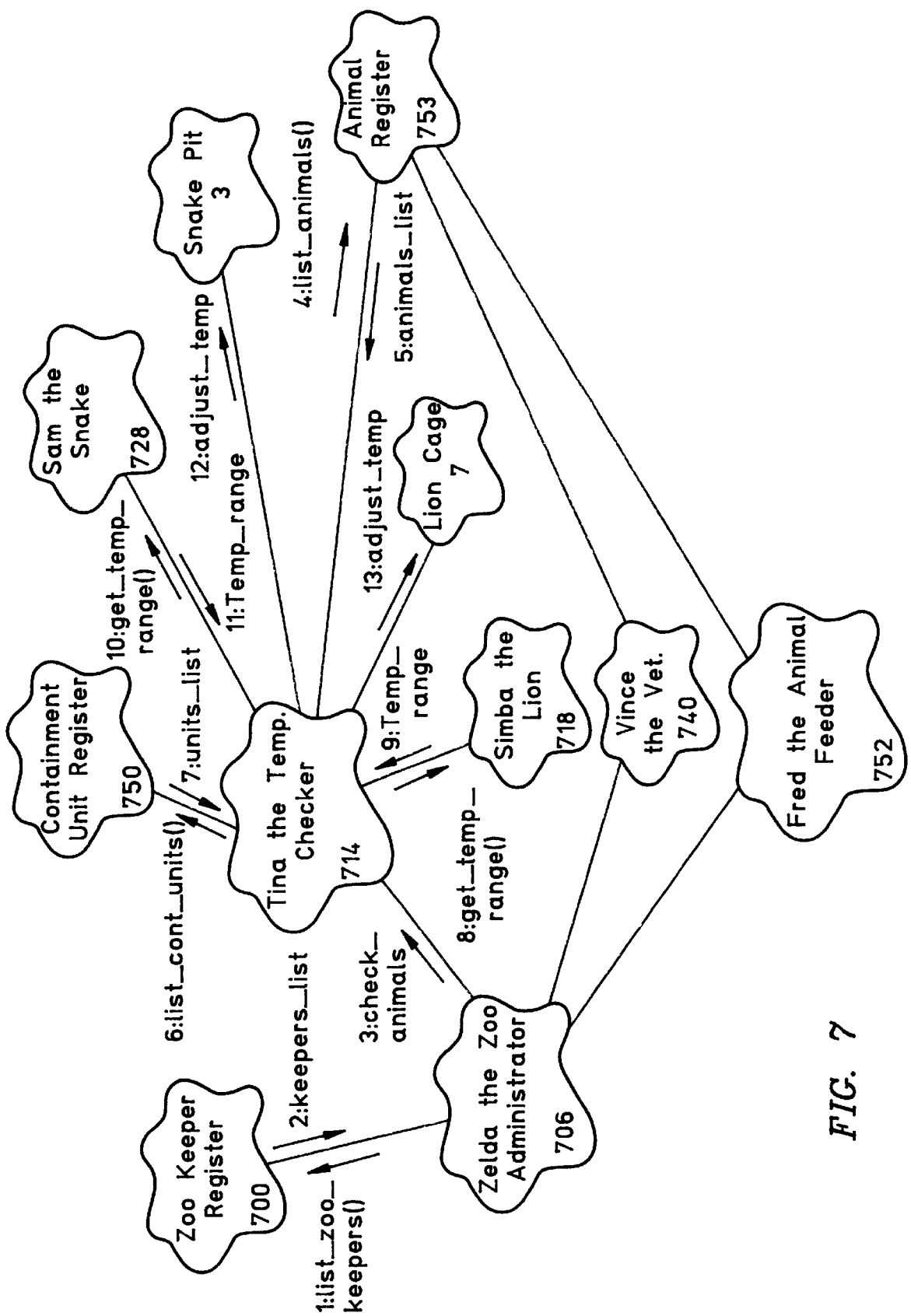
FIG. 7 is an object diagram for the exemplary framework of FIGS. 1 through 6.

FIG. 7 is an object diagram showing how the example objects of ZAF interact to assist zoo personnel in operating the zoo. A detailed analysis of the interaction of all of the ZAF objects is unnecessary for the purposes of this overview. However, the reader should review the following simple control flow to obtain a rudimentary understanding of how objects in an OO environment interact to solve problems.

As mentioned, an object is created to be a member of a particular class. Therefore, the object Zelda the Zoo Administrator 706 is an object that is a member (actually, the only member) of the zoo administrator class. As such, object Zelda is responsible for overall control of ZAF. All of the zoo keeper objects have registered with the Zoo Keeper Register object [object 700]. Therefore, object Zelda obtains a list of the current zoo keepers by calling the list_zoo_keepers( ) operation [step 1] of the Zoo Keeper Register object. The Zoo Keeper Register object 700 has been created as a member of the zoo keeper register class. For the purposes of illustration, assume that this occurs every five minutes as part of Zelda's 5_minute_timer( ) operation. The Zoo Keeper Register object then responds with the zoo keepers list [step 2]. The list of zoo keepers includes Tina the Temperature Checker [object 714], Vince the Vet. [object 740], and Fred the Animal Feeder [object 752]. Each zoo keeper has been created as a member of the zoo keepers class. In particular, objects Tina the Temp. Checker, Vince the Vet., and Fred the Feeder are respectively members of the temperature controller, veterinarian, and feeder subclasses.

Once the list of current zoo keepers has been returned to object Zelda 706, object Zelda instructs each zoo keeper in the list to check the animals by calling the check_animals( ) operation of each zoo keeper object. Only the call to Tina the Temp. Checker is shown, indicated as step 3. It should be noted that object Zelda did not need to understand the types of zoo keepers that were in the zoo keeper list, the number of zoo keeper objects in the list, or the specialized characteristics of any one zoo keeper object. Object Zelda uses the same interface (i.e., the check_animals( ) operation) to communicate with each zoo keeper object. It is then up to the individual zoo keeper objects to perform the task for which they have been created. Each zoo keeper object performs its assigned task through use of its own check_animals( ) operation. For example, object Tina's check_animals( ) operation retrieves a list of current animals from the animal object [object 753] by calling the list animals( ) operation [step 4] and then a list of containment units from the containment unit register object [object 758] by calling the list_cont_units( ) operation [step 6]. Upon examining the animal list, object Tina's check_animals( ) operation determines that there are only two animals currently registered in the zoo, Sam the Snake [object 728] and Simba the Lion [object 718].

Object Tina's check_animals( ) operation then calls the get temp range( ) operations to get temperature ranges from objects Sam and Simba [steps 8 and 10]. Once the temperature ranges have been returned, the check_animals( ) operation of object Tina determines which containment units house the respective animals (i.e., Simba and Sam) and then calls the adjust_temp( ) operation of the appropriate containment unit (i.e., Lion Cage 7 in the case of object Simba and Snake Pit 3 in the case of object Sam) to adjust the temperature of the containment units [steps 12 and 13].

The adjust_temp( ) operation of each containment unit then completes the control flow by proceeding to adjust the temperature in a way that is appropriate for the animals contained in each containment unit. (That is, the temperature is adjusted based on time and temperature for Snake Pit 3 and based on time alone for Lion Cage 7.) The reader should note that the relationship between the check animals( ) operation and the adjust temp( ) operations is polymorphic. In other words, the check_animals( ) operation of object Tina 714 does not require specialized knowledge about how each adjust_temp( ) operation performs its task. The check_animals( ) operation merely had to abide by the interface and call the adjust_temp( ) operations. After that, it is up to the individual adjust_temp( ) operations to carry our their tasks in the proper manner.

At this point, it is again worthwhile to point out that the ZAF system is an extremely simplistic framework that has been presented to help novice readers understand some basic framework concepts so as to better appreciate the benefits and advantages of the present invention. These benefits and advantages will become more clear upon reference to the following Detailed Description.

DETAILED DESCRIPTION

Figure 8:
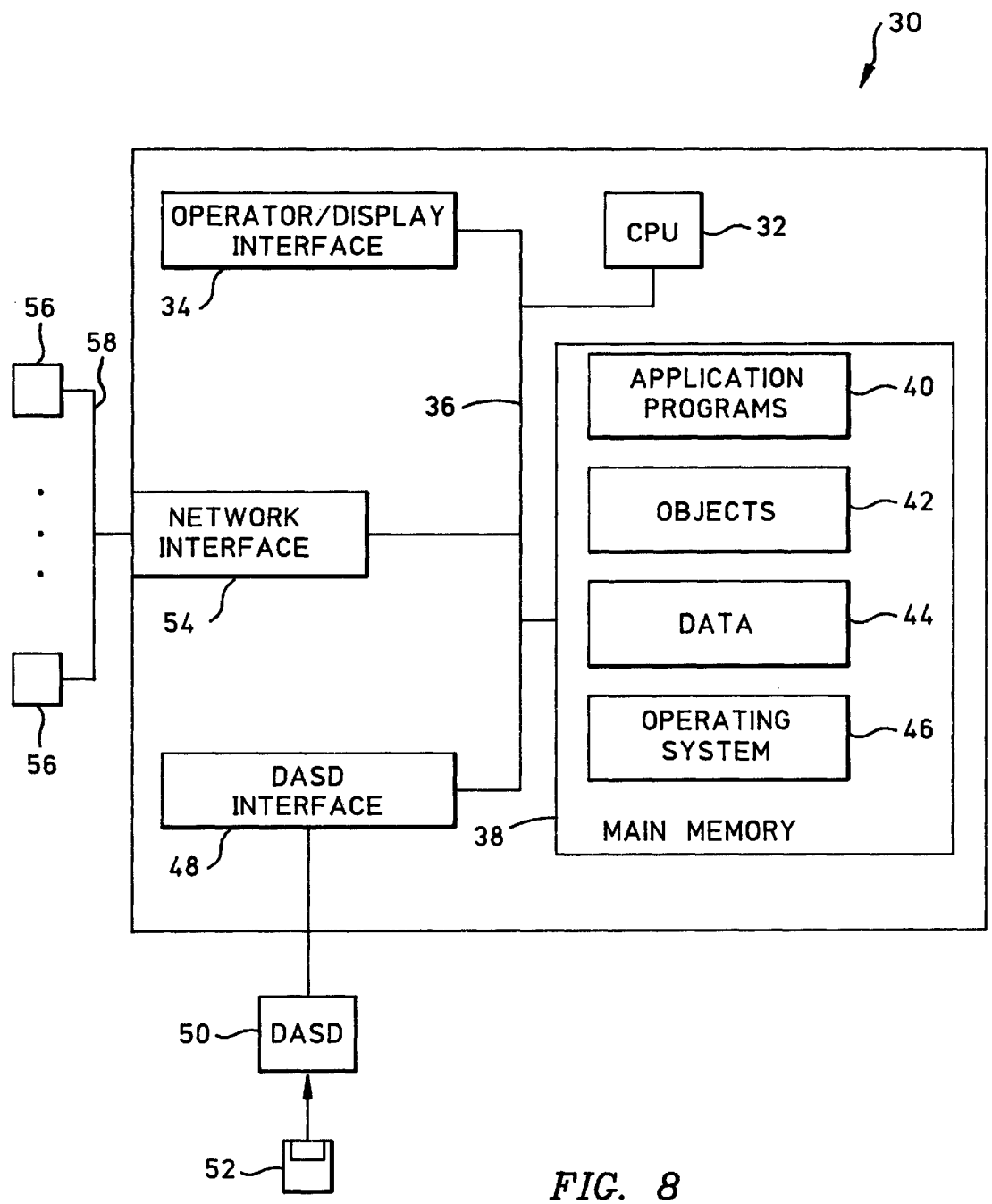
FIG. 8 is a functional block diagram of a computer processing system constructed in accordance with the present invention.

FIG. 8 is a block diagram of a computer system 30 constructed in accordance with the present invention. The computer system includes a central processing unit (CPU) 32 that operates in response to operator commands, which it receives from an operator/display interface 34 to which it is connected by a system bus 36. The CPU also communicates over the system bus with a main memory 38, which is illustrated with a variety of data structures, including application programs 40, objects 42, data 44, and an operating system 46. The main memory 38 is represented as a single entity, but those skilled in the art will appreciate that the main memory can comprise a combination of random access memory (RAM), hard disk drives, optical disk drives, and other storage devices containing logically segmented storage locations.

The operating system 46 preferably supports an object oriented programming environment such as provided, for example, by the C++ programming language. The application programs 40 are invoked, or launched, by a user through the interface 34. The application programs can be written in a variety of languages, including C++.

The computer system 30 also includes a direct access storage device (DASD) interface 48 that is connected to the system bus 36 and is also connected to a DASD 50. Those skilled in the art will appreciate that the DASD 50 can receive and read from program products comprising machine-readable storage devices 52, such as magnetic media disks on which are recorded program instructions whose execution implements the framework of the present invention. The storage devices 52 also can comprise, for example, media such as optical disks and other machine-readable storage devices. The computer system 30 also includes a network interface 54 that permits communication between the CPU 32 and other computer systems 56 over a network 58. The other computer systems 56 can comprise, for example, computer systems similar in construction to the exemplary computer system 30. In that way, the computer system 30 can receive data into the main memory 38 over the network 58 after communication between the computer systems has been established by well-known methods that will be understood by those skilled in the art without further explanation.

Figure 9:
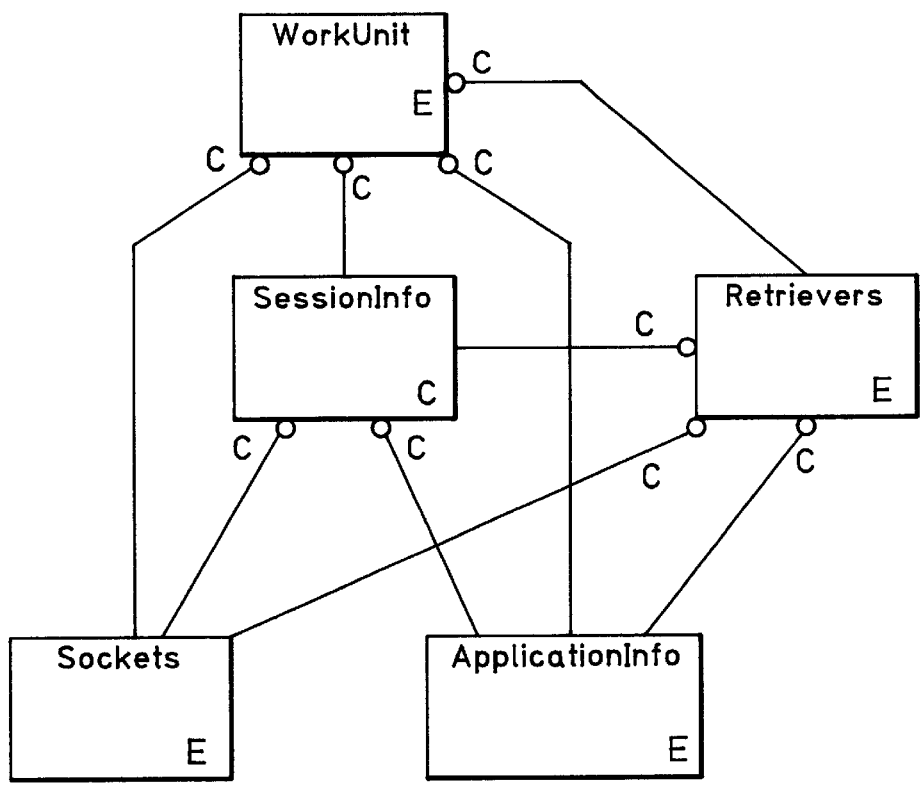
FIG. 9 is a top-level category diagram representation of the Object Oriented Framework implemented by the computer processing system illustrated in FIG. 8.

FIG. 9 is a top-level category diagram for the framework implemented in the computer system of FIG. 8. The FIG. 9 category diagram shows that the framework includes a core class category called SessionInfo and includes extensible class categories called Sockets, ApplicationInfo, Retrievers, and WorkUnit. The association relationships indicated by the connecting lines indicate core "using" relationships from the class category SessionInfo to the class category Sockets and to the class category ApplicationInfo, from the class category Retrievers to the class categories of Sockets, ApplicationInfo, and SessionInfo, and also from the class category WorkUnit to the class categories SessionInfo, Retrievers, Sockets and ApplicationInfo. The WorkUnit category and Socket category together form the "heart" of this framework in conjunction with the core relationships to the other categories.

Figure 10:
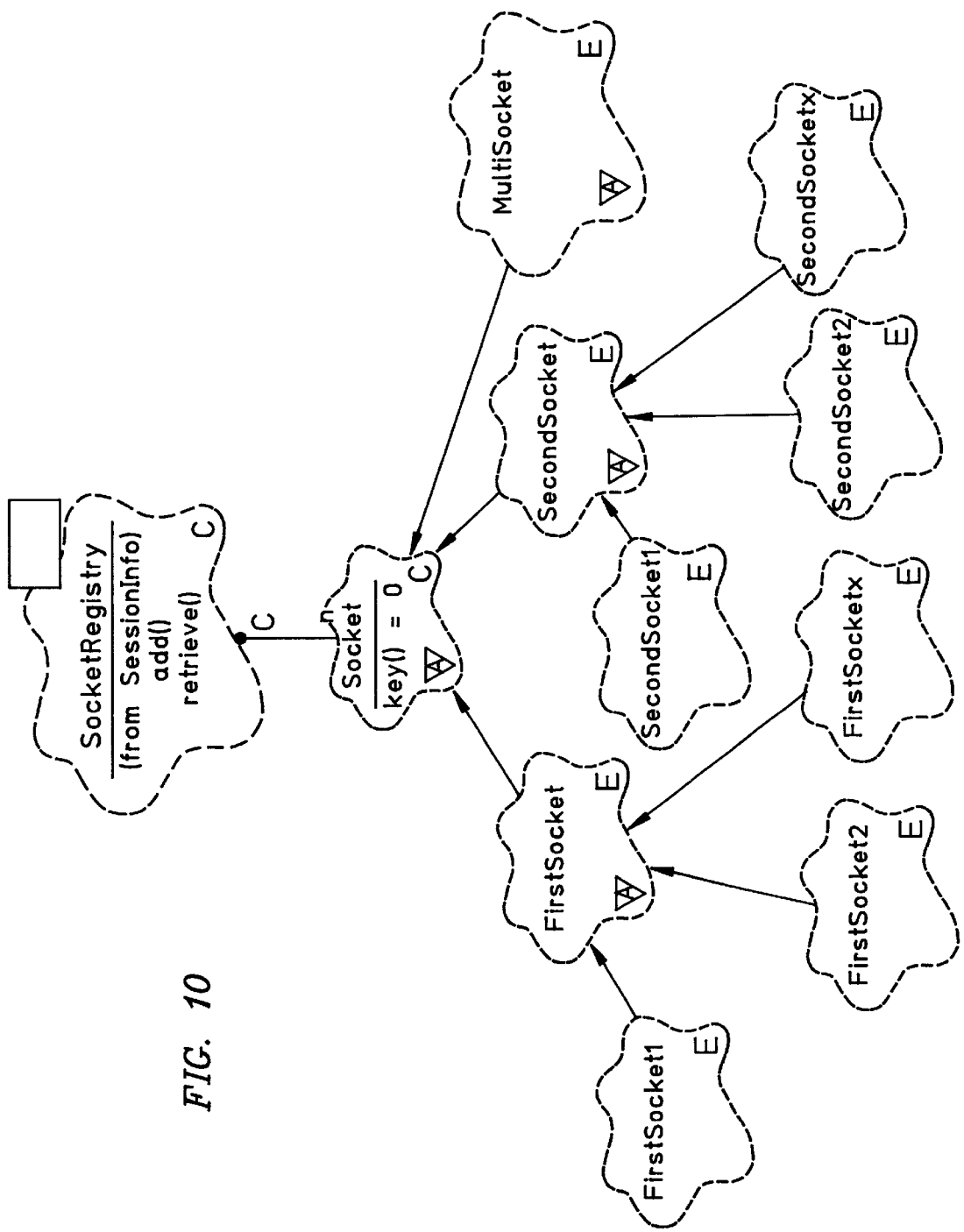
FIG. 10 is a class diagram representation of the Sockets category implemented by the computer processing system illustrated in FIG. 8.

FIG. 10 is a class diagram that illustrates characteristics of the class Socket. FIG. 10 shows that the class Socket includes a pure virtual function called key( ) and is a core class. As described further below, the key( ) operation permits a unique identifier to be associated with each object instance of a Socket. The class adornment comprising a triangle enclosing an upper case block "A" indicates that the class Socket is an abstract base class. FIG. 10 shows that the relationship between the class SocketRegistry and the class Socket is a "has" relationship, meaning that the SocketRegistry class "has" a number of Socket classes contained within it. That is, SocketRegistry is a list of Socket objects. FIG. 10 also shows that the class SocketRegistry includes operations called add( ) and retrieve( ). These operations are for adding Socket objects to the SocketRegistry and for retrieving registered Socket objects in accordance with identified socket key indexes. Such add and retrieval operations are characteristics of particular object-oriented programming languages in which the framework can be programmed, such as the C++ language. Those skilled in the art will understand the details of such operation characteristics without further explanation.

FIG. 10 also illustrates that the class Socket includes a plurality of classes corresponding to a variety of different socket subclasses. Thus, FIG. 10 includes a class cloud called FirstSocket, a class cloud called SecondSocket, and a class cloud called MultiSocket. Each of these socket subclass clouds is indicated as being a core class and also an abstract base class. Thus, the relationship between the class Socket and the subclasses FirstSocket, SecondSocket, and MultiSocket is indicated as an inheritance relationship by the arrowhead pointing from each respective subclass to the Socket superclass. The collection of classes will be referred to generically as socket classes.

Each socket class corresponds to a single process or thread of an application program. For example, if a user of the framework described herein wanted to develop a word processing application program having a graphical user interface, the word processing program might present the program user with a variety of screen displays. The application program developer therefore might want to define the FirstSocket object to comprise a window builder function that assembles the proper data to create a window display. The SecondSocket object might be defined as a display driver, which handles displaying the assembled data to the actual display hardware and processes the program user's input. In this example, the doItS1( ) method of a FirstSocketWorkUnit object would be the function to assemble the window and the doItS2( ) method of the SecondSocketWorkUnit object would be the function to display and handle the user input of the window. Depending on the user input that the doItS2( ) method received, another WorkUnit object may be created and sent to handle the building and displaying of the next window.

FIG. 10 also shows that class FirstSocket has an inheritance relationship to a subclass called FirstSocket1, a core class. In addition, the class FirstSocket has an inheritance relationship with subclasses called FirstSocket2 through FirstSocketX, which are indicated as being extensible classes. At a minimum, this framework requires the existence of an object of class FirstSocket1 in order to process the WorkUnit objects of the application. As shown, extensible classes FirstSocket2 through FirstSocketX can be created and extended to handle the receiving and processing of WorkUnits in a framework client specific way to take advantage of speed or memory requirements or some other opportunity for customization. Similar additional inheritance relationships are indicated from the class SecondSocket to subclasses SecondSocket1 through SecondSocketX where each class is indicated as extensible. Those skilled in the art will appreciate that the class called MultiSocket could also include multiple subclasses with which it has an inheritance relationship in the same fashion as FirstSocket and SecondSocket. An additional observation is that the MultiSocket class is intended to represent that this framework can be extended to 3, 4, . . . , or many Sockets ("Multi" is a generic term to indicate a framework client-defined number of Sockets). The key relationship is that objects of classes derived from FirstSocket all invoke the doItS1( ) method of objects of classes derived from FirstSocketWorkUnit. The manner in which the WorkUnit objects are received and processed is customizable by the framework client by deriving new classes from FirstSocket. Likewise, classes derived from SecondSocket all invoke the doItS2( ) method. However, FirstSocket can process all WorkUnits since all WorkUnits inherit the doItS1( ) method from FirstSocketWorkUnit.

Figure 11:
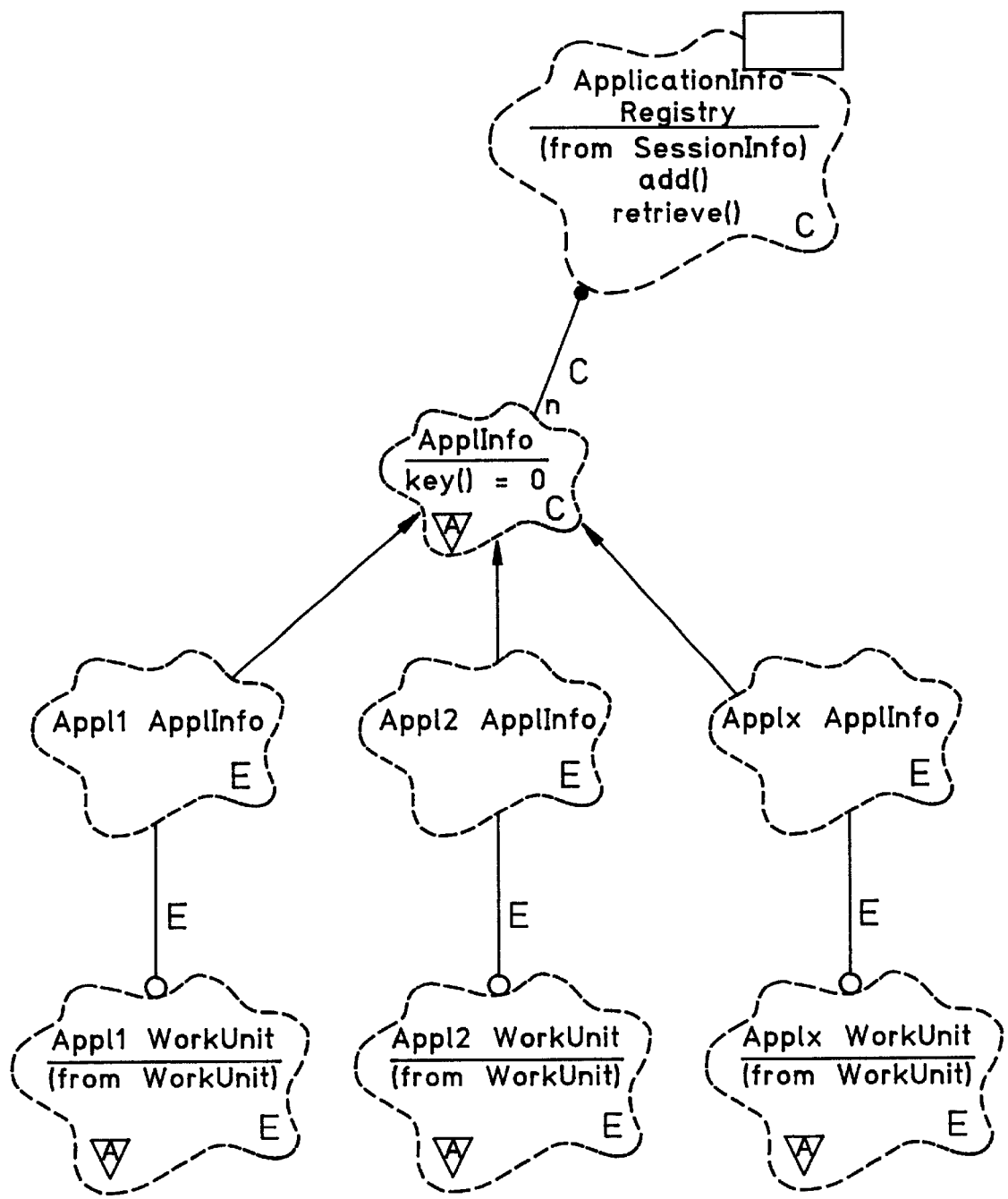
FIG. 11 is a class diagram representation of the ApplicationInfo category implemented by the computer processing system illustrated in FIG. 8.

FIG. 11 illustrates further details for the class called ApplInfo. FIG. 11 shows that the class ApplInfo includes a pure virtual function called key( ). As with the Socket class, the key( ) operation indicates a means of uniquely identifying each ApplInfo object in the framework implementation. That is, there may be one or more different ApplInfo objects, as identified by the adornment or above the class ApplInfo, for each application program being supported by the framework as defined by the program developer. The upper case block letter "C" indicates that the class ApplInfo is a core class, and the class adornment indicates that the class ApplInfo is an abstract base class. FIG. 11 also indicates that the class ApplInfo is related to a class called ApplicationInfoRegistry with a "has" relationship. The class ApplicationInfoRegistry is from the SessionInfo category and includes functions called add( ) and retrieve( ). FIG. 11 also indicates that the ApplicationInfoRegistry class is a core class. Thus, as with the SocketRegistry, it should be clear that ApplicationInfo Registry provides a listing of ApplInfo objects, which are uniquely identified by the framework client. Also, the add( ) operation adds ApplInfo objects to the registry and the retrieve( ) operation obtains an ApplInfo object according to a provided key index. As with the socket class, such add and retrieve operations are characteristics of the object-oriented programming environment in which the framework is implemented and will be understood by those skilled in the art without further explanation.

FIG. 11 indicates that the class ApplInfo is related to subclasses through an inheritance relation, exemplary subclasses being illustrated as Appl1ApplInfo, Appl2ApplInfo, and so forth through ApplXApplInfo. Each of these subclasses is indicated as being an extensible class. Again, this permits tailoring of the framework by the framework client. The framework client is free to add application specific methods and data to classes derived from ApplInfo. Finally, FIG. 11 shows that each ApplInfo subclass is related to a WorkUnit subclass through a "using" relationship. Thus, an object of class Appl1WorkUnit is shown "using" an object of the class Appl1ApplInfo. In general, all WorkUnit objects of an application have access to one or more ApplInfo objects for that application. This relationship between ApplInfo objects and WorkUnit objects allows the sharing of data and common functions among WorkUnit objects. Each WorkUnit object is free to query and update an ApplInfo object as needed by a particular application. Each of the other ApplInfo classes is shown with a corresponding "using" relationship to a WorkUnit class. Each of the WorkUnit classes is indicated as being an extensible class and as being an abstract class.

Figure 12:
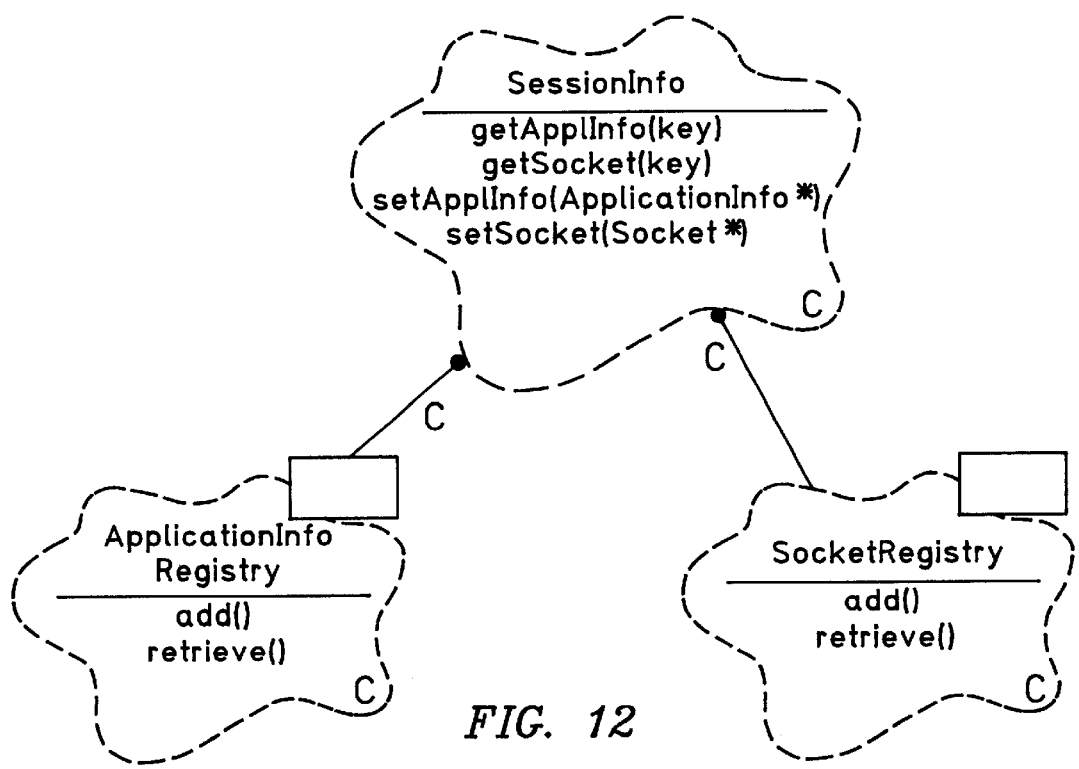
FIG. 12 is a class diagram representation of the SessionInfo category implemented by the computer processing system illustrated in FIG. 8.

FIG. 12 is a class diagram for the SessionInfo class. There is a single SessionInfo class object in the framework. In general, it is common practice to refer to class names with the first letter capitalized and to the members (data) and member functions (methods) with the first character as lower case. This is by convention and helps to keep class names and member names distinct. FIG. 12 is consistent with this convention.

FIG. 12 shows that the SessionInfo class is a core class that includes operations called getApplInfo( ), getSocket( ), setApplInfo( ), and setSocket( ). FIG. 12 also shows the class SessionInfo with a "has" relationship to the class ApplicationInfoRegistry and with a "has" relationship to the class SocketRegistry. Thus, FIG. 12 indicates that the SessionInfo includes the ApplicationInfo and Socket registries and can retrieve appropriate objects and add objects into the respective registries with the "Get" and "Set" operations, respectively. It is important to note that both registries are templatized classes, or container classes. Each container class must contain objects that are all instances of the same class or instances of classes derived from the same class. In this framework, ApplicationInfoRegistry contains ApplInfo objects and SocketRegistry contains Socket objects. The Retriever class objects described below are mechanisms for retrieving base class objects from these registries and converting them to the specific derived class object.

Figure 13:
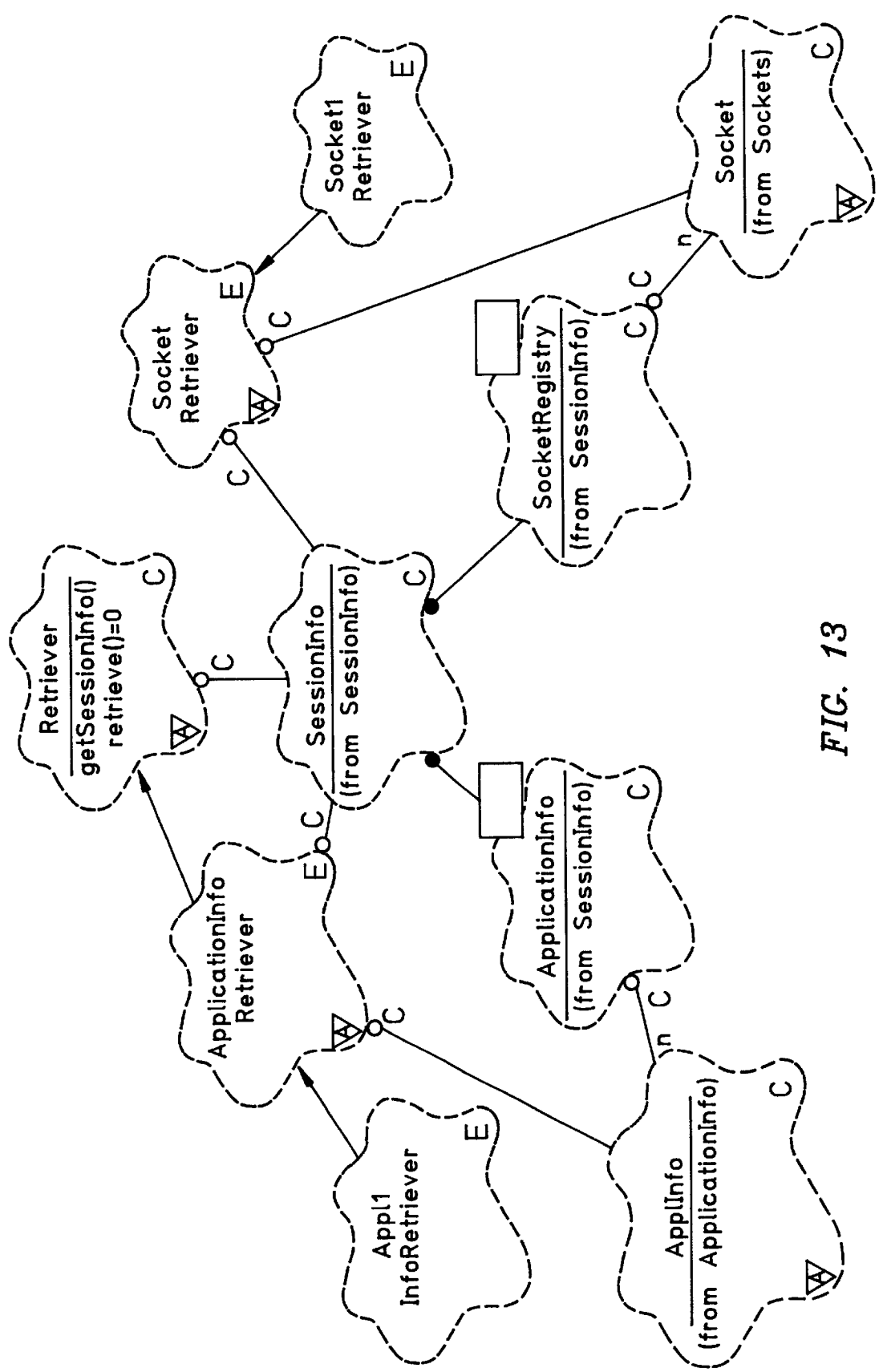
FIG. 13 is a class diagram representation of the Retrievers category implemented by the computer processing system illustrated in FIG. 8.

FIG. 13 shows details of the class called Retriever. FIG. 13 shows that the Retriever class is a core class and an abstract base class that includes two method operations called getSessionInfo( ) and retrieve( ). The method retrieve( ) is defined to be a pure virtual function. FIG. 13 shows that the Retriever class is related to the SessionInfo( ) class in a "using" relationship, such that the class Retriever uses the class SessionInfo. FIG. 13 also shows that the Retriever class is related to classes called ApplicationInfoRetriever and SocketRetriever through an inheritance relationship. Each of these subclasses is indicated as being an extensible class and an abstract base class.

The function of a retriever object is to retrieve an appropriate ApplInfo or Socket object from its respective registry, as the case may be, based on a value returned by the key( ) method of the ApplInfo or Socket object. That is, the Retriever object is a mapping function in the object-oriented programming environment. If the ApplInfo or Socket object doesn't already exist, the retriever will create the appropriate object and add it to the respective registry and return that object to the requesting WorkUnit object. This prevents the need to regenerate the ApplInfo and Socket objects over and over again since they are required for many steps in processing an application using this framework. In addition, since the Retriever objects are the sole creators of the ApplInfo and SocketInfo objects with which they are associated, the Retriever objects are capable of maintaining a specific type identity with the objects that they create. Those skilled in the art of programming will appreciate this as "safe downcasting" without further explanation. This mechanism is what allows the framework client to add members (data) and member functions (methods) to classes derived from ApplInfo in a seamless manner.

FIG. 13 also shows that the class ApplicationInfoRetriever is related to several classes. First, the class ApplInfoRetriever has an inheritance relationship to the ApplicationInfoRetriever class. The class ApplicationInfoRetriever has a "using" relationship with the ApplInfo class from the ApplicationInfo category and has a "using" relationship with the SessionInfo class from the SessionInfo category. The ApplicationInfoRetriever class is responsible for constructing its associated ApplInfo class and adding it to the SessionInfo object will the setApplInfo( ) method. It also retrieves its associated ApplInfo object from the SessionInfo object with the getApplInfo( ) method. In addition, the SessionInfo class is shown with a "has" relationship to the ApplicationInfoRegistry class which, in turn, is shown with a "using" relationship with the ApplInfo class.

FIG. 13 also shows that the class SocketRetriever has relationships with several classes. First, the class Socket1 Retriever has an inheritance relationship with the class Socket Retriever. The class SocketRetriever is shown having a "using" relationship with the Socket class from the Sockets category and a "using" relationship with the SessionInfo class from the SessionInfo category. Much like the ApplicationInfoRetriever class, this class will construct the associated Socket class and add or retrieve the Socket object from the SessionInfo object by use of the setSocket( ) and getSocket( ) methods respectively. In addition, the SessionInfo class is shown with a "has" relationship to the SocketRegistry class which, in turn, is shown with a "using" relationship with the Socket class. Such relationships permit seamless operation with whatever user-defined socket objects might be added by the framework client.

Figure 14:
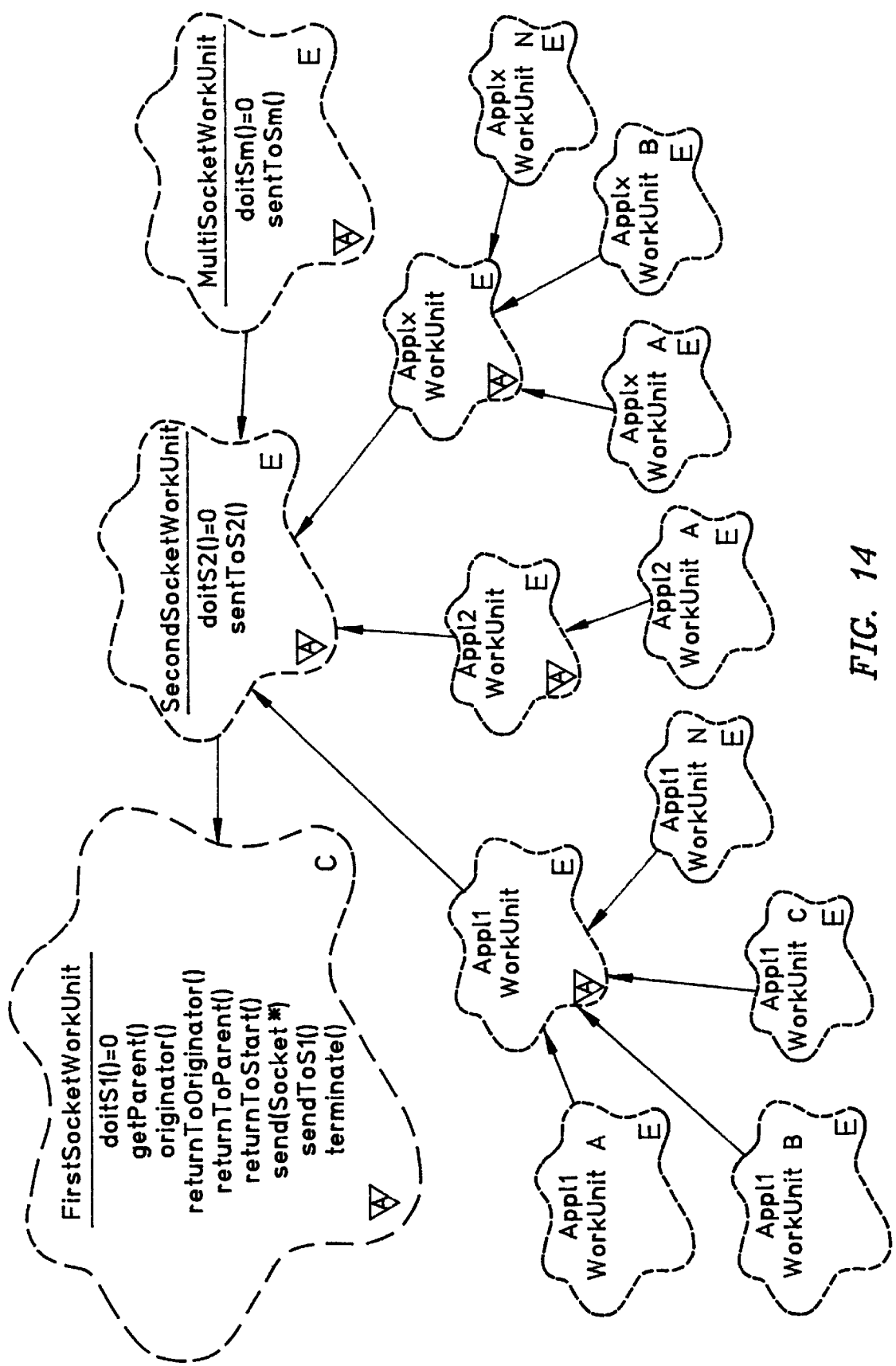
FIG. 14 is a class diagram representation of the WorkUnit class implemented by the computer processing system illustrated in FIG. 8.

FIG. 14 is a class diagram for the WorkUnit category. FIG. 14 shows that a class called FirstSocketWorkUnit includes operations called doItS1( ), getParent( ), originator( ), returnToOriginator( ), returnToParent( ), returnToStart( ), send( ), sendToS1( ), and terminate( ). FIG. 14 indicates that this class is a core class and is an abstract base class. FIG. 14 also shows that the class FirstSocketWorkUnit has an inheritance relationship with a subclass called SecondSocketWorkUnit. This relationship indicates that multi-step WorkUnit objects are possible and also permits any WorkUnit objects derived from the class FirstSocketWorkUnit to interface and be chained together with any of the abstract base class WorkUnit objects shown in FIG. 14 (i.e., objects from SecondSocketWorkUnit or from MultiSocketWorkUnit, etc.). Put another way, WorkUnit objects derived from SecondSocketWorkUnit can be sent to two different Socket objects (i.e., FirstSocket and SecondSocket) to carry out two separate steps (i.e., doItS1( ) and doItS2( ), respectively).

WorkUnit objects derived from FirstSocketWorkUnit are by definition one-step WorkUnit objects and can only be sent to the FirstSocket for processing. FirstSocketWorkUnit objects cannot be sent to the SecondSocket because they do not contain the member function doItS2( ), which is what the SecondSocket invokes. Those skilled in the art of object oriented programming will quickly appreciate that this design is extendable to 3, 4, . . . , or many Sockets (i.e., MultiSocket and MultiSocketWorkUnit where "Multi" is a generic term to indicate a framework client-defined number of Sockets and WorkUnits to send to those Sockets). A WorkUnit object flows from the FirstSocket, to the SecondSocket, etc., for each "doIt" method defined. At a minimum, a single process application would only have a FirstSocket for sequentially processing WorkUnit objects of that application derived from FirstSocketWorkUnit. Adding a SecondSocket opens up the design to asynchronous processing since each Socket runs in its own thread or process in a multiprocessing system. Extending beyond two Sockets allows more parallel processing.

WorkUnit objects are designed to be modular functions of an application using the framework. The "doIt" methods are pure virtual functions to allow the framework client to specify precisely what each WorkUnit object is supposed to do. Going back to the example of a word processing application, each WorkUnit object could represent a window in a graphical user interface. Each option from that window could be implemented as a WorkUnit object. In this example, a word processing application would need to select and open a file from the computer file system. A WorkUnit object could be created to carry out this task. In fact, several WorkUnit objects may be used to subdivide this task into smaller tasks. The word "task" in this sense is not meant to refer to a thread of control or a process. Rather, task is meant to refer generally to a computer operation or packet of work that must be performed for an application program.

The end result is that once these WorkUnit objects are coded and working, the very same WorkUnit objects can be used by a second application that needs to do the same thing. For example, a spreadsheet application would need the ability to select and open files from the computer file system as well. If the spreadsheet application is written using this framework, the very same WorkUnit objects can be used to select and open the file without the need for the application developer to write any additional code. The application developer can add functions if needed, since the derived WorkUnit classes are extensible.

FIG. 14 shows a class called Appl1WorkUnit with an inheritance relationship to the SecondSocketWorkUnit class and also includes a class called Appl2WorkUnit with an inheritance relationship to the SecondSocketWorkUnit class. These derived abstract classes could be thought of as the word processing application and spreadsheet application respectively, where each of these abstract base classes are further derived into a plurality of individual WorkUnit objects that make up the application (i.e., Appl1WorkUnitA, Appl1WorkiUnitB, Appl1WorkUnitC, . . . , Appl1WorkUnitN). Those skilled in the art will appreciate that similar relationships can exist for classes derived from FirstSocketWorkUnit or for MultiSocketWorkUnit.

Figure 15:
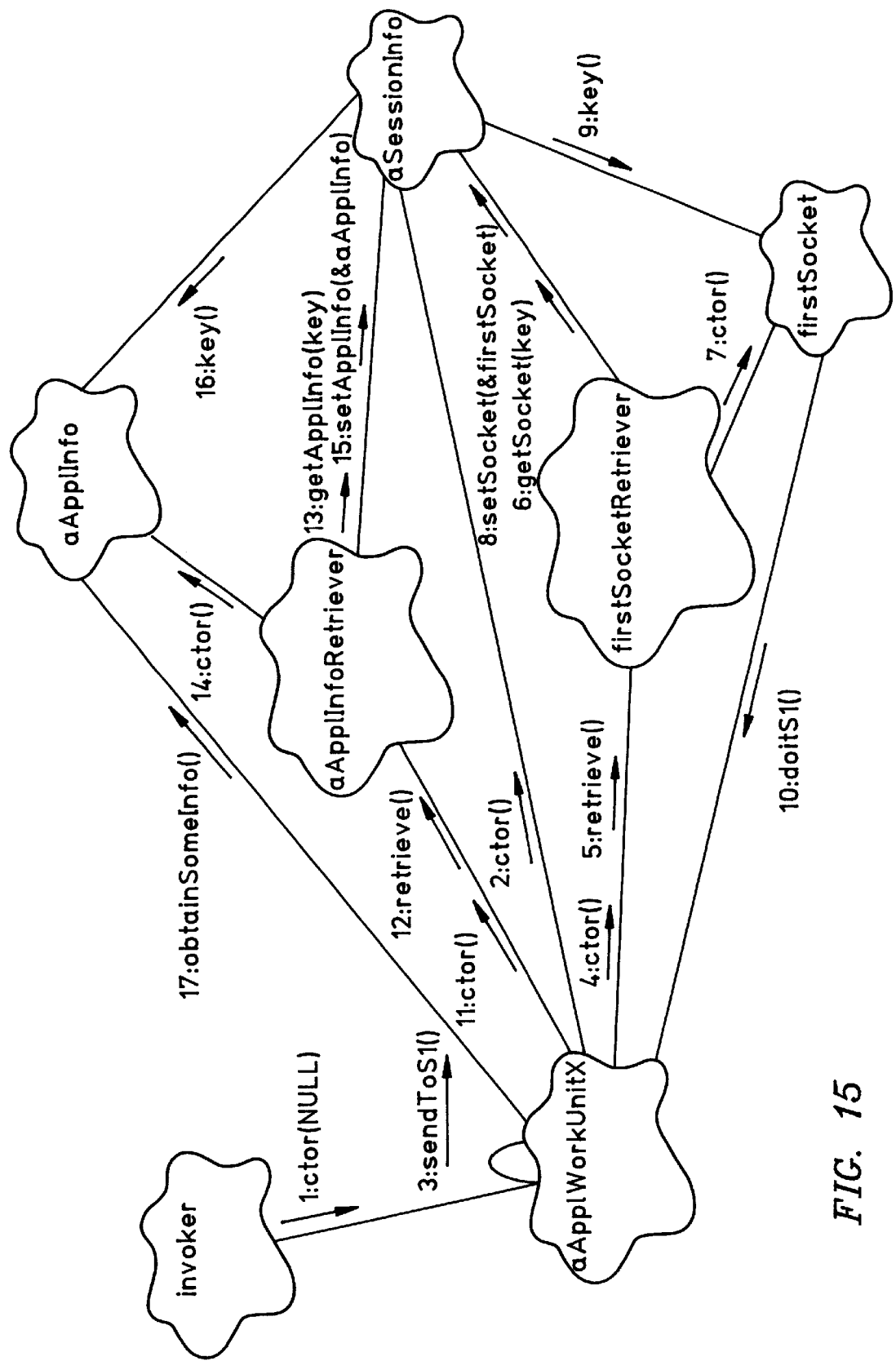
FIGS. 15, 16, 17, 18, and 19 are object diagrams representing processing steps executed by the host processor illustrated in FIG. 8 when performing a piece of work.

FIG. 15 is a top-level object diagram for the framework implemented in the computer system illustrated in FIG. 8. FIG. 15 shows that processing of the framework begins with an invoker routine that calls a constructor routine to create an object called aApplWorkUnitX. This shows it is possible to enter an application from a beginning WorkUnit of an application or from some other WorkUnit of an application (i.e., allowing possible multiple entry points into an application). In the preferred embodiment, the framework is implemented within a system that supports the C++ programming language. Therefore, C++ programming language constructs will be shown on the object diagram. For example, the first step in the object diagram of FIG. 15 is indicated as the C++ language constructor function called ctor (null) to carry out the construction of the first WorkUnit object. Those skilled in the art will understand the details of such construction operations without further explanation.

FIG. 15 shows that the second step executed by the system is for the object aApplWorkUnitX to call the constructor function of the SessionInfo class. That is, when the application program supported by the framework is initially called, or invoked, the SessionInfo object must be constructed. The third step is to call the sendToS1( ) function on the object aApplWorkUnitX to send this WorkUnit object to the FirstSocket object to be processed. That is, the WorkUnit object calls a method operation on itself. Next, a socket retriever is needed to retrieve a Socket object to send aApplWorkUnitX to. Therefore, FIG. 15 indicates that the fourth step is for the object aApplWorkUnitX to call the constructor function of the class FirstSocketRetriever and then in step 5 to retrieve the object of the class FirstSocket using the retrieve( ) operation.

FIG. 15 shows that step 6 is for the firstSocket Retriever object to call the getSocket( ) function from the aSessionInfo object. The retriever has knowledge of the appropriate socket which it needs, based on its definition. Step 7 is to construct the socket. Because FIG. 15 indicates an initial invocation of the framework, the first socket must be constructed. Therefore, there is a call from the firstSocket Retriever object to the firstSocket class using the C++ constructor function. Next, in step 8, the firstSocket Retriever object calls the aSessionInfo object with a setSocket( ) function call and a firstSocket object reference, which adds the constructed socket to the socket registry. In step 9, aSessionInfo object calls the firstSocket object with the key( ) operation to get the appropriate key value for the socket. Next, in step 10, the firstSocket object calls the aApplWorkUnitX object with a doItS1( ) function. The doItS1( ) function is defined by the framework client to carry out some task. This task might involve getting and manipulating some data contained in an ApplInfo object. In step 11, an object of the class ApplicationInfoRetriever is constructed by calling the constructor function. Step 12 is calling the retrieve( ) method on an aApplInfoRetriever object to get the ApplInfo object. Step 13 is a call to the getApplInfo( ) function on the aSessionInfo object. The result is that the ApplInfo object does not exist in the ApplicationInfoRegistry of aSessionInfo so the aApplInfoRetriever object needs to construct one. Step 14 is calling the constructor function on the ApplInfo class. Step 15 is adding an aApplInfo object to the ApplicationInfoRegistry by calling the setApplInfo( ) function on the aSessionInfo object. For aSessionInfo to add the aApplInfo object to its registry of ApplInfo objects, it needs to get the unique key to identify this ApplInfo object. Therefore, step 16 is retrieving the key with the key( ) function called on aApplInfo object. Finally, step 17 is aApplWorkUnitX calling obtainSomeInfo( ) function on the aapplInfo object. This method call is user-defined by the framework client and can be named accordingly. Likewise, several calls to aApplInfo could be made at this point if necessary. For this example, one call will suffice.

Figure 16:
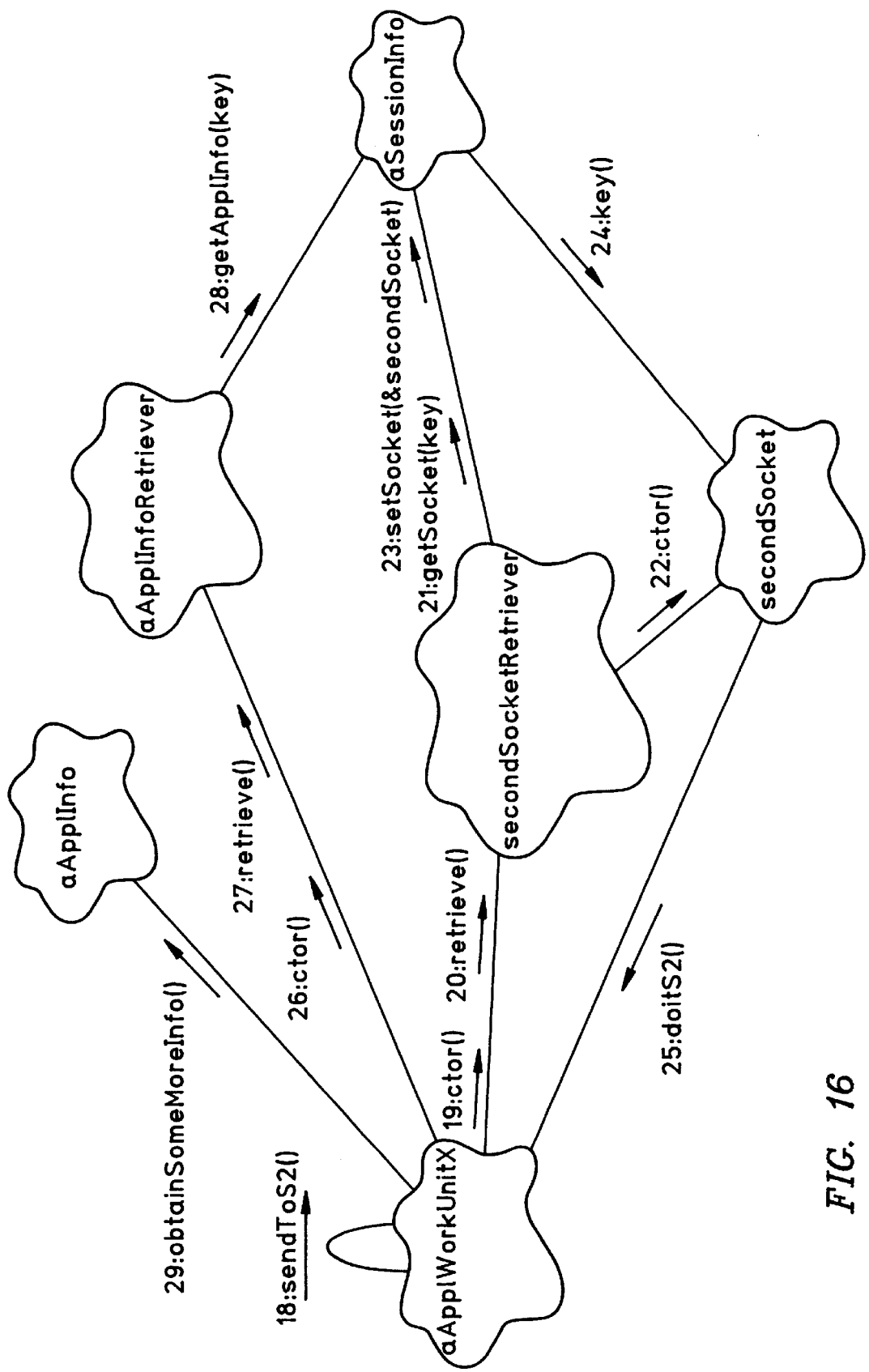

In this example, we will assume that an object aApplWorkUnitX is instantiated from a class derived from SecondSocketWorkUnit. This means that the processing of this WorkUnit object is not complete until it is sent to the SecondSocket object to be processed. FIG. 16 assumes such processing is necessary and continues the WorkUnit processing. If aApplWorkUnitX was instantiated from a class derived directly from FirstSocketWorkUnit, it would only require one step and would be complete at this point.

Again, the figures apply to the initial processing, so that the second socket has not yet been constructed when the first WorkUnit is sent on to the second socket. Thus, FIG. 16 shows that step 18 is to send the WorkUnit to a second socket using a call to the sendToS2( ) operation and step 19 is for the aApplWorkUnitX object to call a SecondSocketRetriever class using the C++ constructor function to carry out constructing the second socket. The aApplWorkUnitX object then calls the secondSocketRetriever object using the retrieve( ) function. Step 21 is shown as a call from the secondSocketRetriever object to the aSessionInfo object using the getSocket( ) operation to request the socket, step 22 is to construct the socket with a call from the secondSocketRetriever object to the SecondSocket class using the C++ constructor function. The next step is to add the socket to the registry of aSessionInfo, so step 23 is for the secondSocket Retriever object to call the aSessionInfo object with the setSocket( ) function call and a secondSocket object reference.

The next processing step is for the aSessionInfo object to call the secondSocket object with the key( ) operation to get the key index for the second socket. The secondSocket object is ready to receive the WorkUnit object and therefore calls an aApplWorkUnit object with a doItS2( ) function call. It should be noted that the preferred embodiment of the invention is implemented in a multi-tasking environment, such as the AS/400 machine from IBM Corporation shown in the drawings. Therefore, several processes can be executing concurrently, including several WorkUnits, depending on the WorkUnit definitions specified by the framework client. That is, each defined socket can comprise a different process that can be executing along with other sockets, each of which can be processing a different WorkUnit object. For example, a complex mathematical operation (such as a matrix multiplication or computation of standard deviation of a sample population) can be defined by a framework client such that multiple sockets operate on constituent portions of the mathematical operation before the final result is obtained. In the example described thus far, the same work unit has proceeded from the first socket (S1) to the second socket (S2), which have therefore been constructed and are now ready for any subsequent WorkUnit operation for which they might be required. Thus, using the C++ constructor function for either of these two sockets will be unnecessary in processing future WorkUnit objects that use these sockets. This case is also true for use of aApplInfo object since it was already constructed in FIG. 15; there is no need to reconstruct it in FIG. 16. All that needs to be done is to create an instance of the ApplInfoRetriever class, which is done in step 26. Step 27 is a call to the retrieve( ) method on the aApplInfoRetriever object, which in step 28 calls getApplInfo( ) function on aSessionInfo. Since the aApplInfo object has previously been created and added to the ApplicationInfoRegistry of aSessionInfo, this function will simply return a reference to the existing object for use by the calling WorkUnit object. The aApplWorkUnitX object can now call obtainSomeMoreInfo( ) in step 29 on object aApplInfo. Again, the methods called on aApplInfo are user-defined by the framework client. At this point, the work packet of aApplWorkUnitX needs to be further broken down into other WorkUnit work packets. Processing in accordance with the framework then proceeds to the object diagram of FIG. 17.

Figure 17:
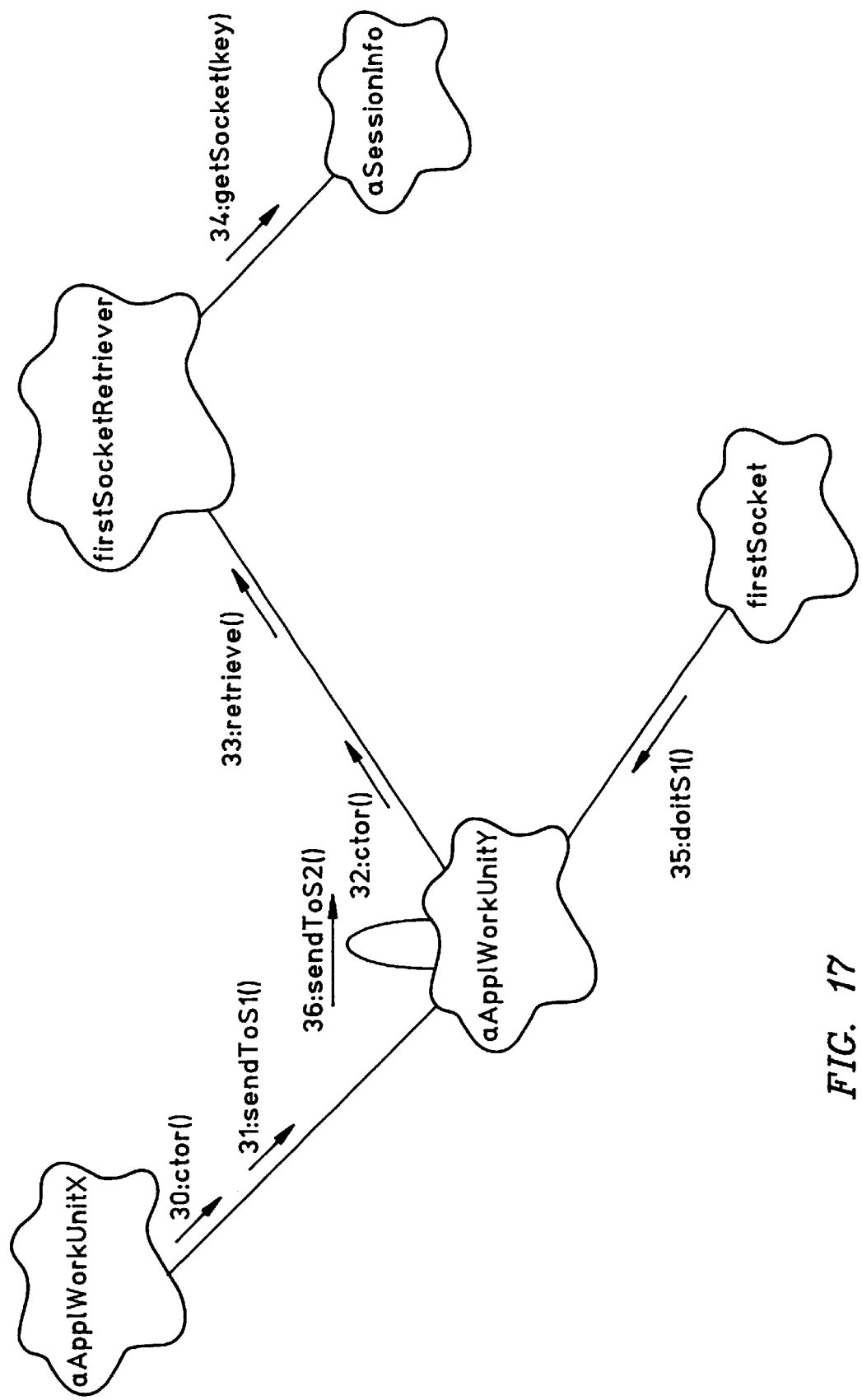

The first processing step shown in FIG. 17 (step 30) is a call to the aApplWorkUnitY class with a C++ constructor function, followed by sending the WorkUnit object to the first socket with a call to the sendToS1( ) function. FIG. 17 shows that the next step (step 32) is for an aApplWorkUnitY object to call the FirstSocket Retriever class with a constructor function and then to retrieve that socket with a call to the retrieve( ) function (step 33). Step 34 is to go to the aSessionInfo object to get the socket corresponding to the key index value known by the firstSocketRetriever using the getSocket( ) function. The first socket already has been constructed and is in the registry, so the aSessionInfo object simply returns the first Socket without using the constructor operation. The firstSocket object recognizes that it has a WorkUnit object to perform, so it next calls a doItS1( ) on the WorkUnit object (step 35). An aApplWorkUnitY object then calls itself with a call to the sendToS2( ) function (step 36). It should be noted that WorkUnitY gets sent to the second socket only if the framework client has defined the Y work unit to require two-step processing. That is, in the exemplary processing shown, WorkUnitY has available two methods, doItS1( ) and doItS2( ). Such processing is determined by the type of work unit objects defined by the framework client and by the type of work unit objects from which the aApplWorkUnitY object is derived.

Figure 18:
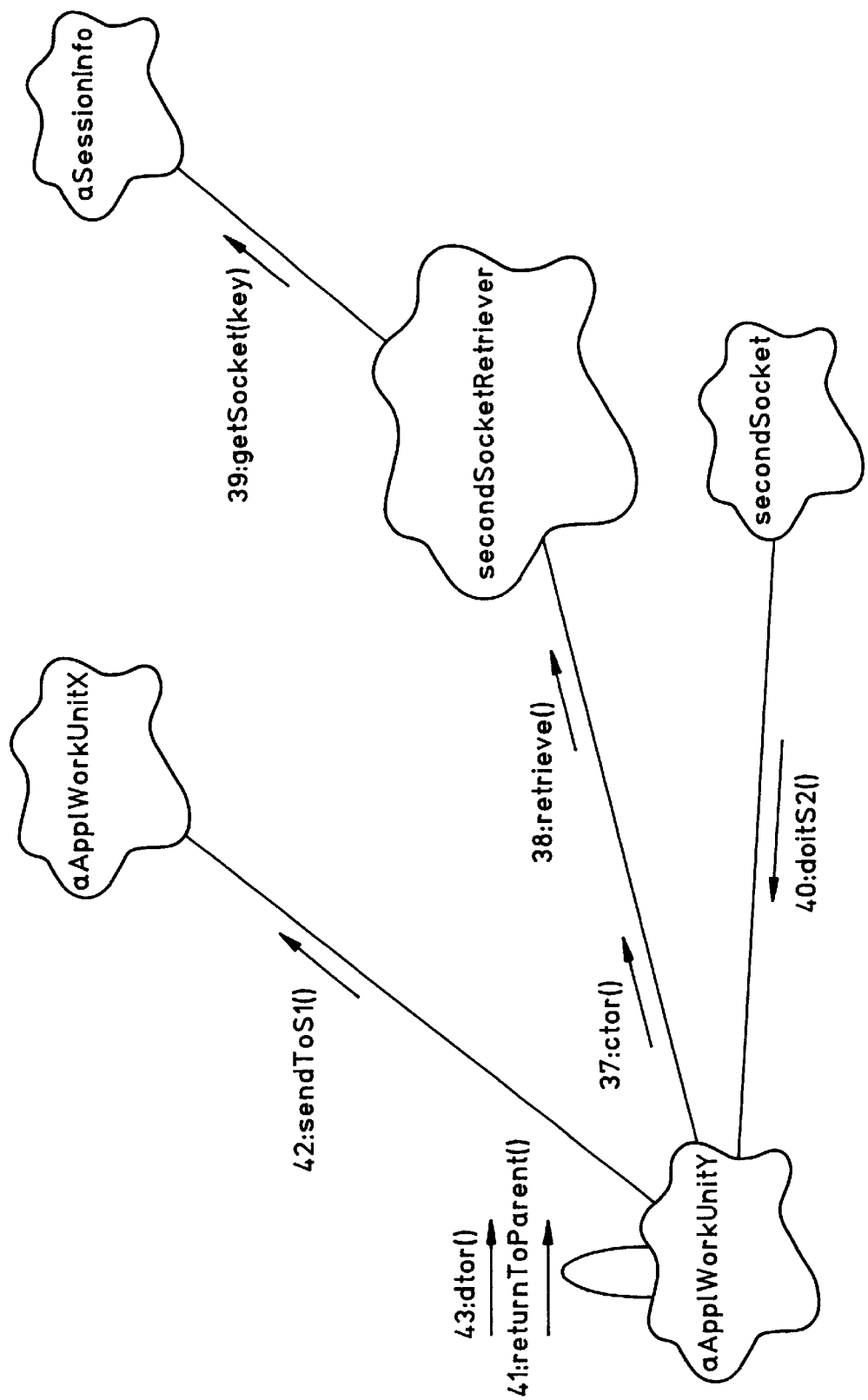

After the WorkUnit object is passed to the second socket, framework processing next proceeds with the object diagram of FIG. 18. Step 37 shown in FIG. 18 is for the second socket retriever to be constructed and step 38 is to call the corresponding retriever method. The secondSocket Retriever object then calls the aSessionInfo object using the function getSocket( ) in step 39. The next processing step is for the class SecondSocket to call the aApplWorkUnitY object using the doItS2( ) function call. At completion of the second socket processing, the WorkUnit object work packet is completed. Therefore, the aApplWorkUnitY object responds after the second socket completion with a call to the function returnToParent( ), shown as step 41. The returnToParent( ) method is a core function of FirstSocketWorkUnit defined to destruct the current WorkUnit object and to return control to the "parent" WorkUnit (i.e., the WorkUnit that constructed the current WorkUnit). This method is a virtual method with a default implementation to destruct the current WorkUnit object and to send the parent WorkUnit object to the first Socket using sendToS1( ). Making it a virtual method allows the framework client to override this method to customize the behavior of this call. It should be noted that other methods exist as core functions of the WorkUnit category to returnToStart( ) or to returnToOriginator( ) also. In this example we have only shown going one parent-child WorkUnit relationship deep. In more complex examples, the relationship may be several WorkUnit layers deep and may need to return all the way back to the beginning WorkUnit, which is what returnToStart( ) is used for. Another situation might be several WorkUnit layers deep and need to return back to some specific WorkUnit that is not the first WorkUnit in the chain. The returnToOriginator( ) method is used in conjunction with the originator( ) function to set a WorkUnit as the "originator" and to return to it when the returnToOriginator( ) method is called.

Continuing with step 42 in FIG. 18, aApplWorkUnitY calls sendToS1( ) on its parent WorkUnit object. aApplWorkUnitlY has now completed its work packet and will call its destructor in step 43 to release its storage from memory. The framework processing is continued in FIG. 19.

Figure 19:
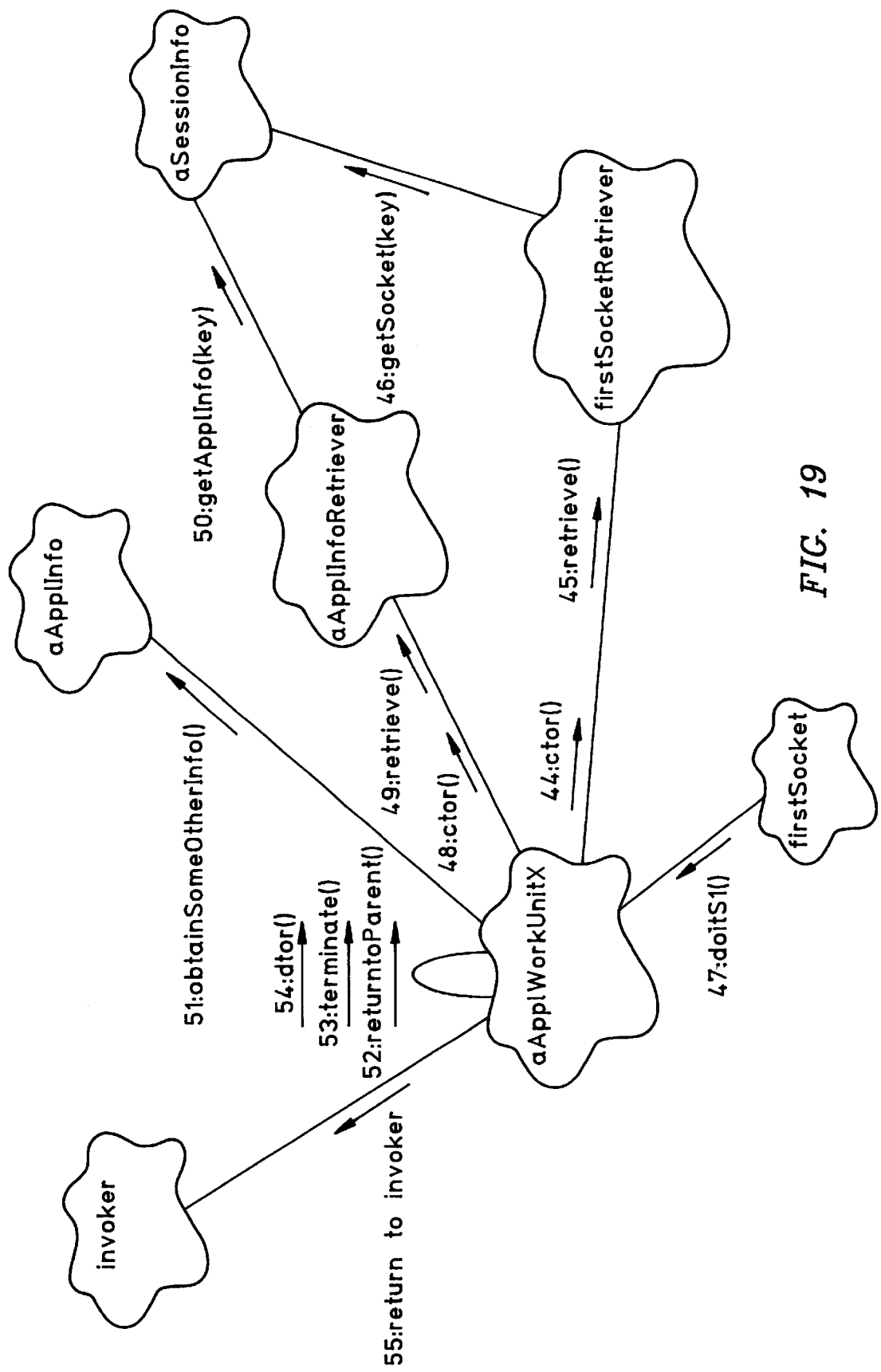

FIG. 19 shows that the aApplWorkUnitX class next calls the firstSocket Retriever class using the C++ constructor function and then retrieves the firstSocket object using the retrieve( ) function (step 49). The firstSocket Retriever object responds with a call to the aSessionInfo object using the getSocket( ) function. At step 47, the WorkUnit object is processed by the firstSocket object with a call to doItS1( ). Note that this is the second pass for aApplWorkUnitX to the firstSocket object. This time aApplWorkUnitX will check the aApplInfo object to see that it has completed its task as defined by state information in the WorkUnit object itself or contained in aApplInfo. Steps 48–50 go through the routine retriever idiom to get aApplInfo. Step 51 is a framework client-defined call to obtainSomeOtherInfo( ) from aApplInfo. For this example, aApplWorkUnitX has determined that its work packet ask is complete. Therefore, at step 52, aApplWorkUnitX calls returnToParent( ) on itself. Because aApplWorkUnitX has no parent, the next processing step is for aApplWorkUnitX object to call the terminate( ) function (step 53). This is the default behavior for methods returnToParent( ), returnToStart( ) and returnToOriginator( ) if no parent WorkUnit object exists. The terminate( ) function ensures clean-up of all processes, threads, and memory consumed by objects of the framework. The C++ destructor function is called on aApplWorkUnitX in step 54. Those skilled in the art will recognize that all objects contained by aApplWorkUnitX will also be destructed at the same time. Finally, the application has completed and control returns to the invoker function, which could be the operating system of the computer or another application program that called this application.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

Notation

There is, as yet, no uniformly accepted notation for communicating object-oriented programming ideas. The notation used in this specification is very similar to that known in the programming industry as Booch notation, after Grady Booch. Mr. Booch is the author of *Object-Oriented Analysis and Design With Applications*, 2d ed. (1994), available from The Benjamin/Cummings Publishing Company, Inc. Use of Booch notation concepts within this specification should not be taken to imply any connection between the inventors and/or the assignee of this patent application and Mr. Booch or Mr. Booch's employer. The notational system used by Mr. Booch is more fully explained at Chapter 5, pp. 171–228 of the aforementioned book. The notational system used herein will be explained generally below. Other notational conventions used herein will be explained as needed.

A system that is modeled by an object-oriented framework can be represented at a high level of abstraction by a diagram called a top-level class diagram. FIG. 1 of the drawings is an example of a top-level class diagram containing boxes that represent abstractions of the modeled system. The boxes are arranged in a hierarchy such that boxes representing abstractions close to the physical components of the system are at the lower levels of the diagram and boxes representing more abstract, functional components are closer to the top of the diagram. In FIG. 1, the boxes are labelled as "mechanisms" to denote that the abstractions comprise means for implementing modeled system components. The boxes (mechanisms) can be thought of as categories comprising groups of similar classes defined according to object-oriented programming concepts. FIG. 1 represents a zoo administration model and therefore the lower hierarchy boxes include a box called Animal Mechanism, which represents animals within the zoo model, and a box called Containment Unit Mechanism, which represents animal pens and cages. At the highest level of FIG. 1, the box called Zoo Administration represents a functional abstraction that encompasses a variety of administrative tasks that are performed by personnel.

The boxes in a top-level class diagram represent the system abstractions that provide the system behavior. The system abstractions include classes and objects. Details of the system classes are provided in a class diagram that is used to show the class categories and to indicate the relationships and responsibilities of the classes. A class is represented by an irregularly shaped, dashed-line icon commonly referred to a cloud. FIG. 2, for example, shows several classes represented as clouds. Each class is identified by a name that is unique to the associated class category and also indicates the relationship of each class to one of the mechanisms illustrated in FIG. 1. Within a class icon, the class name is listed above attribute names, operation names followed by parentheses, and constraints that are enclosed within brackets. FIG. 3 illustrates the class Zoo Administrator in greater detail. FIG. 3 indicates that the Zoo Administrator class includes multiple operations, including ones called "5_minute_timer( )", "add_animal( )", and "add_containment_unit( )". Words in the operation names (and class attribute names) are separated by an underscore for easier reading. An example of a class attribute listing is shown by the attributes called "feed_freq" and "temp_range" in the class Animals illustrated in FIG. 5.

Connecting lines between mechanisms (FIG. 1) and classes (FIG. 2) indicate the nature of the relationships between such respective abstractions. Thus, connections between the boxes in FIG. 1 represent relationships between the various mechanisms. A straight connecting line, for example, represents a simple association relationship indicating shared information. A "using" relationship is a refinement of a simple association whereby one abstraction that is referred to as a server or supplier provides services to another abstraction that is referred to as a client. Such a relationship is indicated by an open circle at one end of a simple association line, the open circle end designating the client that "uses" the associated server.

Another refinement of a simple association between two classes is a type referred to as an inheritance relationship. Inheritance is a relationship among classes in which one class shares the structure and/or behavior associated with one or more other classes. An inheritance association is also referred to as a "is a" relationship. Thus, given two classes A and B, the class A has an inheritance relationship with the class B if A is an example of a B; A is said to be a subclass of B and B is said to be a superclass or parent of A. That is, A "is a" B. An inheritance relationship is denoted with a connecting line that includes an arrowhead at one end to indicate a subclass that derives its characteristics from a parent class at the other end of the line.

Another refinement of class relationships is called an aggregation relationship, which denotes an association between a whole and its parts or attribute classes. In notation, an aggregation relationship is indicated between a whole class and an attribute class connected with an association line by a solid circle at the whole class end, with an attribute class at the other end.

Another relationship specified by a class diagram is an instantiation relationship. An instantiation relationship represents an instance of a class such as a particular implementation of a class as supported by a programming language. For example, a class called "animal" can have multiple instantiations comprising lions, tigers, and bears. An instantiation of a class is represented by a dashed association line with an arrowhead pointing from an instance of a class to the general class.

Finally, a class relationship referred to as a metaclass denotes a relationship in which a class itself is treated as an object that can be manipulated. That is, a metaclass is a class whose instances are themselves classes. Some computer languages, such as Small Talk, support the concept of a metaclass. Such relationships are denoted by a shaded line with an arrowhead pointing from an instance of a metaclass to the general metaclass.

Classes can be parameterized, which denotes a family of classes whose structure and behavior are defined independently of its formal class parameters. A parameterized class is represented by a cloud-shaped class icon with a rectangular box placed over a portion of the cloud. The parameter list is named within the rectangular box. An instantiated class includes a parameter box, called an adornment, in contrast to a dashed line box for a general class. The instantiation relationship between a parameterized class and its instantiated class is represented as a dashed line pointing to the parameterized class. Typically, an instantiated class requires a "using" relationship to another concrete class for use as an actual parameter.

Properties of classes can be represented by class adornments that are enclosed within the class cloud icon. In particular, an abstract class is denoted by an upper case block "A" within a triangle that is placed within a cloud. An abstract class is a class for which no instances may be created. That is, it is a class of classes. Other class adornments are functions of the OO implementation language. For example, the C++ language permits special class qualifications that will be given special adornments. A static class is represented by an upper case block "S" within an adornment triangle, a friend class is denoted by an upper case block "F" within an adornment triangle, and a virtual class is represented by an upper case block "V" within an adornment triangle.

In addition to defining classes, a designer of an object oriented programming system must define objects (see page 136 of Booch). Objects are represented as solid line clouds within which is placed the object name located above a list of object attributes. An object is a tangible entity that exhibits a well defined behavior. An object is intended to represent some part of a real system that is being represented by the object oriented program. An object is characterized by a state, a behavior, and an identity. An object can be thought of as an instance of a class. The behavior of an object is an indication of how the object acts and reacts in terms of its state changes and its message-passing actions.

Objects and their interrelationships are represented in object diagrams that comprise object icons having links that indicate synchronization between objects. Links are sequentially numbered to indicate the flow of operations. The existence of a link between two objects indicates an association between their corresponding classes and denotes a path of communication between them. Thus, a link between two objects indicates that one object may send messages to another. The direction of message transfer is indicated by adorning a simple connecting line with an arrowhead that points from an object that invokes an operation, referred to as the client, to the object that provides the operation, referred to as the supplier. Such a representation of a simple synchronization relationship denotes the simplest form of message-passing. Such an association can indicate, for example, the invocation of an operation. Operation parameters can be indicated adjacent the linking line.

Some objects may be active, meaning that they embody their own thread of control. That is, such objects are not simply sequential. Active objects may have a variety of concurrency characteristics. If an object has multiple threads of control, then synchronization must be specified. Message synchronization can be synchronous, meaning that the client will wait until the supplier accepts the message. Synchronous synchronization is indicated with an "X" with an arrowhead. Synchronization can encompass balking message-passing, meaning that the client will abandon the message if the supplier cannot immediately service the message. Balking is indicated with an arrowhead turned back on itself. Synchronization can encompass a time-out synchronization, meaning that the client will abandon the message if the supplier cannot service the message within a specified amount of time. Time-out synchronization is indicated with a clock face representation adjacent a linking arrowhead. Finally, synchronization can encompass an asynchronous message, meaning that the client sends an event to a supplier for processing, the supplier queues the message, and the client then proceeds without waiting for the supplier. Those skilled in the art will appreciate that asynchronous message synchronization is analogous to interrupt handling. Asynchronous message synchronization is indicated with a half arrowhead.

It bears mention that the Booch notation includes interaction diagrams that trace the execution of objects and classes. Interaction diagrams are essentially restructured object diagrams. That is, interaction diagrams do not convey any additional information from that conveyed by object diagrams, but simply present the same information in a different format. The present specification makes use of object diagrams rather than interaction diagrams, but those skilled in the art will recognize that they are equivalent and also will understand how to convert from one to the other without further explanation.

In FIG. 7, for example, the object called Zelda 706 obtains a list of current zoo keepers by calling an operation called List Zoo Keepers from the object called Zoo Keeper Register. The second processing step is represented in FIG. 7 by the Zoo Keeper Register object responding to the operation call by passing a message to the Zelda object that comprises the zoo keeper list. The zoo keeper objects include members of the Zoo Keepers class called Tina, Vince, and Fred. The third step indicated in the object diagram is for the object Zelda to pass a message to each of the zoo keepers instructing them to check the animals by calling the respective Check Animals operation of each zoo keeper object.

We claim:

1. A computer system comprising:

a central processing unit;

a user interface; and a main memory having an operating system that supports an object-oriented programming environment containing a framework that permits development of one or more application programs by a framework user, wherein the framework maintains one or more socket objects that each comprise a single process of an application program and receive work unit objects each of which comprises an application program operation to be performed according to a framework user-defined object method for the application program being developed and a session information object that identifies the application program to be serviced, and thereby directs the flow of performing application program operations;

wherein the session information object maintains a registry of application information objects that identify the application programs having operations to be performed.

2. A computer system as defined in claim 1, wherein the programming environment further includes:

retriever objects called by the application information objects to identify predetermined socket objects.

3. A computer system comprising:

a central processing unit;

a user interface: and a main memory having an operating system that supports an object-oriented programming environment containing a framework that permits development of one or more application programs by a framework user, wherein the framework maintains one or more socket objects that each comprise a single process of an application program and receive work unit objects each of which comprises an application program operation to be performed according to a framework user-defined object method for the application program being developed, and a session information object that identifies the application program to be serviced, and thereby directs the flow of performing application program operations;

wherein the programming environment further includes:

retriever objects called by the socket objects for receiving work unit objects.

4. A computer system as defined in claim 3, wherein each socket object includes a task method function that performs a predetermined programming task.

5. A computer system as defined in claim 4, further including a plurality of ordered socket object types, wherein each socket object in the type order has an inheritance relationship with the preceding socket object.

6. A computer system as defined in claim 5, wherein each socket object type that comprises a parent class includes a sending method function that calls a child socket object type.

7. A computer system comprising:

a central processing unit;

a user interface; and a main memory having an operating system that supports an object-oriented programming environment containing a framework that permits development of one or more application programs by a framework user, wherein the framework maintains one or more socket objects that each comprise a single process of an application program and receive work unit objects each of which comprises an application program operation to be performed according to a framework user-defined object method for the application program being developed, and a session information object that identifies the application program to be serviced, and thereby directs the flow of performing application program operations;

wherein the programming environment further includes:

a registry of the socket objects that will receive work unit objects;

a registry of application information objects that identify the application programs having application program operations to be performed;

retriever objects called by the application information objects to identify predetermined socket objects;

retriever objects called by the socket objects for receiving work unit objects; and a plurality of core objects comprising predetermined instances of the socket objects, application information objects, work unit objects, and retriever objects and also includes a plurality of extensible objects comprising user-defined instances of the socket objects, application information objects, work unit objects, and retriever objects.

8. An object oriented framework for use in a computer system having an operating system that supports an object oriented programming environment in which one or more application programs are developed by a framework user and application program operations are performed and having a memory in which the framework can be stored the framework comprising:

one or more socket objects that each comprise a single process of an application program and request information for processing;

application information objects that specify application programs that can be serviced by the framework;

work unit objects that are generated by application programs and comprise application program operations to be performed according to a framework user-defined object method for the application program being developed; and a session information object that identifies the application program to be serviced; and thereby directs the flow of performing application program work packets;

wherein the session information object maintains a registry of application information objects that identify the application programs having operations to be performed.

9. A framework as defined in claim 8, wherein the framework further includes:

retriever objects called by the application information objects to identify predetermined socket objects.

10. An object oriented framework for use in a computer system having an operating system that supports an object oriented programming environment in which one or more application programs are developed by a framework user and application program operations are performed and having a memory in which the framework can be stored the framework comprising:

one or more socket objects that each comprise a single process of an application program and request information for processing;

application information objects that specify application programs that can be serviced by the framework;

work unit objects that are generated by application programs and comprise application program operations to be performed according to a framework user-defined object method for the application program being developed;

a session information object that identifies the application program to be serviced, and thereby directs the flow of performing application program work packets; and retriever objects called by the socket objects for receiving work unit objects.

11. A framework as defined in claim 10, wherein each socket object includes a task method function that performs a predetermined programming task.

12. A framework as defined in claim 11, further including a plurality of ordered socket object types, wherein each socket object in the type order has an inheritance relationship with the preceding socket object.

13. A framework as defined in claim 12, wherein each socket object type that comprises a parent class includes a sending method function that calls a child socket object type.

14. An object oriented framework for use in a computer system having an operating system that supports an object oriented programming environment in which one or more application programs are developed by a framework user and application program operations are performed and having a memory in which the framework can be stored the framework comprising:

one or more socket objects that each comprise a single process of an application program and request information for processing;

application information objects that specify application programs that can be serviced by the framework;

work unit objects that are generated by application programs and comprise application program operations to be performed according to a framework user-defined object method for the application program being developed;

a session information object that identifies the application program to be serviced and thereby directs the flow of performing application program work packets;

a registry of the socket objects that will receive work unit objects;

a registry of application information objects that identify the application programs having work packets to be performed;

retriever objects called by the application information objects to identify predetermined socket objects;

retriever objects called by the socket objects for receiving work unit objects; and a plurality of core objects comprising predetermined instances of the socket objects, application information objects, work unit objects, and retriever objects and also includes a plurality of extensible objects comprising user-defined instances of the socket objects, application information objects, work unit objects, and retriever objects.

15. A program product for use in a computer system having an operating system that supports an object-oriented programming environment, the program product comprising:

a recordable media; and a framework that permits development of one or more application programs by a framework user and that is recorded on the recordable media, the framework having one or more socket objects that each comprise a single process of an application program and request information and process information;

application information objects that specify application programs that can be serviced by the framework;

work unit objects that are generated by application programs and comprise an application program operation to be performed according to a framework user-defined object method for the application program being developed; and a session information object that identifies the application program to be serviced, and thereby directs the flow of performing application program operations;

wherein the session information object of the recorded framework maintains a registry of application information objects that identify the application programs having operations to be performed.

16. A program product as defined in claim 15, wherein the framework further includes;

retriever objects called by the application information objects to identify predetermined socket objects.

17. A program product for use in a computer system having an operating system that supports an object-oriented programming environment, the program product comprising:

a recordable media; and a framework that permits development of one or more application programs by a framework user and that is recorded on the recordable media, the framework having one or more socket objects that each comprise a single process of an application program and request information and process information;

application information objects that specify application programs that can be serviced by the framework;

work unit objects that are generated by application programs and comprise an application program operation to be performed according to a framework user-defined object method for the application program being developed; and a session information object that identifies the application program to be serviced and thereby directs the flow of performing application program operations; and retriever objects called by the socket objects for receiving work unit objects.

18. A program product as defined in claim 17, wherein each socket object includes a task method function that performs a predetermined programming task.

19. A program product as defined in claim 18, further including a plurality of ordered socket object types, wherein each socket object in the type order has an inheritance relationship with the preceding socket object.

20. A program product as defined in claim 19, wherein each socket object type that comprises a parent class includes a sending method function that calls a child socket object type.

21. A program product for use in a computer system having an operating system that supports an object-oriented programming environment the program product comprising:

a recordable media; and a framework that permits development of one or more application programs by a framework user and that is recorded on the recordable media, the framework having one or more socket objects that each comprise a single process of an application program and request information and process information;

application information objects that specify application programs that can be serviced by the framework;

work unit objects that are generated by application programs and comprise an application program operation to be performed according to a framework user-defined object method for the application program being developed; and a session information object that identifies the application program to be serviced and thereby directs the flow of performing application program operations;

a registry of the socket objects that will receive work unit objects;

a registry of application information objects that identify the application programs having application program operations to be performed;

retriever objects called by the application information objects to identify predetermined socket objects;

retriever objects called by the socket objects for receiving work unit objects; and a plurality of core objects comprising predetermined instances of the socket objects, application information objects, work unit objects, and retriever objects and also includes a plurality of extensible objects comprising user-defined instances of the socket objects, application information objects, work unit objects, and retriever objects.

22. A method for distributing a program product, the method comprising the steps of:

establishing a connection between a first computer system and a second computer system; and transmitting the program product from the first computer system to the second computer system, wherein the program product comprises an object oriented framework that permits development of one or more application programs by a framework user, the framework having one or more socket objects that each comprise a single process of an application program and request information and process information;

application information objects that specify application programs that can be serviced by the framework;

work unit objects that are generated by application programs and each comprise an application program operation to be performed according to a framework user-defined object method for the application program being developed; and a session information object that identifies the application program to be serviced, and thereby directs the flow of performing application program operations;

wherein the session information object of the program product framework maintains a registry of application information objects that identify the application programs having operations to be performed.

23. A method for distributing a program product as defined in claim 22, wherein the program product framework further includes:

retriever objects called by the application information objects to identify predetermined socket objects.

24. A method for distributing a program product, the method comprising the steps of:

establishing a connection between a first computer system and a second computer system; and transmitting the program product from the first computer system to the second computer system, wherein the program product comprises an object oriented framework that permits development of one or more application programs by a framework user, the framework having one or more socket objects that each comprise a single process of an application program and request information and process information;

application information objects that specify application programs that can be serviced by the framework;

work unit objects that are generated by application programs and each comprise an application program operation to be performed according to a framework user-defined object method for the application program being developed;

a session information object that identifies the application program to be serviced, and thereby directs the flow of performing application program operations; and retriever objects called by the socket objects for receiving work unit objects.

25. A method for distributing a program product as defined in claim 24, wherein each socket object of the program product framework includes a task method function that performs a predetermined programming task.

26. A method for distributing a program product as defined in claim 25, the program product framework further including a plurality of ordered socket object types, wherein each socket object in the type order has an inheritance relationship with the preceding socket object.

27. A method for distributing a program product as defined in claim 26, wherein each socket object type of the program product framework that comprises a parent class includes a sending method function that calls a child socket object type.

28. A method for distributing a program product, the method comprising the steps of:

establishing a connection between a first computer system and a second computer system; and transmitting the program product from the first computer system to the second computer system, wherein the program product comprises an object oriented framework that permits development of one or more application programs by a framework user, the framework having one or more socket objects that each comprise a single process of an application program and request information and process information;

application information objects that specify application programs that can be serviced by the framework;

work unit objects that are generated by application programs and each comprise an application program operation to be performed according to a framework user-defined object method for the application program being developed; and a session information object that identifies the application program to be serviced, and thereby directs the flow of performing application program operations;

a registry of the socket objects that will receive work unit objects;

a registry of application information objects that identify the application programs having operations to be performed;

retriever objects called by the application information objects to identify predetermined socket objects;

retriever objects called by the socket objects for receiving work unit objects; and a plurality of core objects comprising predetermined instances of the socket objects, application information objects, work unit objects, and retriever objects and also includes a plurality of extensible objects comprising user-defined instances of the socket objects, application information objects, work unit objects, and retriever objects.

29. A method of executing an application program in a computer system having a central processing unit that controls processing in the computer system, a user interface, and a main memory having an operating system that supports an object oriented programming environment, the method comprising the steps of:

provided an object oriented framework that permits development of one or more application programs by a framework user, wherein the framework maintains one or more socket objects that each comprise a single process of an application program and receive work unit objects and directs the flow of performing application program operations;

invoking an application program;

constructing a work unit object that comprises an application program operation to be performed according to a framework user-defined object method for the application program being developed;

constructing a session information object that identifies the application program to be serviced;

constructing a socket object that controls performance of the work unit object corresponding to the application program task; and destructing the work unit object after the socket object has completed performance of the task;

wherein the computer system includes a plurality of application programs and the method further includes the step of maintaining a registry of application information objects that identify the application programs having operations to be performed.

30. A method as defined in claim 29, further including the step of constructing retriever objects that are called by the application information objects and identify predetermined socket objects associated with the application programs.

31. A method of executing an application program in a computer system having a central processing unit that controls processing in the computer system, a user interface, and a main memory having an operating system that supports an object oriented programming environment, the method comprising the steps of:

providing an object oriented framework that permits development of one or more application programs by a framework user, wherein the framework maintains one or more socket objects that each comprise a single process of an application program and receive work unit objects and directs the flow of performing application program operations;

invoking an application program;

constructing a work unit object that comprises an application program operation to be performed according to a framework user-defined object method for the application program being developed;

constructing a session information object that identifies the application program to be serviced;

constructing a socket object that controls performance of the work unit object corresponding to the application program task;

destructing the work unit object after the socket object has completed performance of the task; and constructing retriever objects that are called by the socket objects for receiving work unit objects called by the application program.

32. A method as defined in claim 31, wherein each socket object includes a task method function that performs a predetermined programming task.

33. A method as defined in claim 32, further including the step of constructing a plurality of ordered socket object types, wherein each socket object in the type order has an inheritance relationship with the preceding socket object.

34. A method as defined in claim 33, wherein each constructed socket object type that comprises a parent class includes a sending method function that calls a child socket object type.

35. A method of executing an application program in a computer system having a central processing unit that controls processing in the computer system a user interface, and a main memory having an operating system that supports an object oriented programming environment, the method comprising the steps of:

providing an object oriented framework that permits development of one or more application programs by a framework users wherein the framework maintains one or more socket objects that each comprise a single process of an application program and receive work unit objects and directs the flow of performing application program operations;

invoking an application program;

constructing a work unit object that comprises an application program operation to be performed according to a framework user-defined object method for the application program being developed;

constructing a session information object that identifies the application program to be serviced;

constructing a socket object that controls performance of the work unit object corresponding to the application program task; and destructing the work unit object after the socket object has completed performance of the task;

maintaining a registry of the socket objects that will receive work unit objects;

maintaining a registry of application information objects that identify the application programs having operations to be performed;

constructing retriever objects called by the application information objects to identify predetermined socket objects;

constructing retriever objects called by the socket objects for receiving work unit objects; and constructing a plurality of core objects comprising predetermined instances of the socket objects, application information objects, work unit objects, and retriever objects and permitting construction of a plurality of extensible objects comprising user-defined instances of the socket objects, application information objects, work unit objects, and retriever objects.

* * * * *

UNITED STATES PATENT AND TRADEMARK OFFICE
CERTIFICATE OF CORRECTION

PATENT NO. : 6,266,708 B1
DATED : July 24, 2001
INVENTOR(S) : Shawn M. Austvold; Rebecca B. Legler; Marshall P. Cline; Daniel R. Dahl; Jim Evans; Peter M. Gaertner; Neal Hale; Sujatha Pothireddy It is certified that error appears in the above-identified patent and that said Letters Patent is hereby corrected as shown below:

Column 32, claim 35,
Line 23, "users" should read -- user, --.

Signed and Sealed this

First Day of January, 2002

Attest:

Attesting Officer

JAMES E. ROGAN
Director of the United States Patent and Trademark Office